(12) United States Patent
Stone et al.

(10) Patent No.: US 7,278,540 B2
(45) Date of Patent: Oct. 9, 2007

(54) ADJUSTABLE BASKET VIBRATORY SEPARATOR

(75) Inventors: Lyndon Stone, Humble, TX (US); Eric Scott, Conroe, TX (US); Norman Padolino, Montgomery, TX (US); Kevin McDonough, Spring, TX (US); Kenneth W. Seyffert, Houston, TX (US); Guy L. McClung, III, Spring, TX (US)

(73) Assignee: Varco I/P, Inc., Houston, TX (US)

( * ) Notice: Subject to any disclaimer, the term of this patent is extended or adjusted under 35 U.S.C. 154(b) by 292 days.

(21) Appl. No.: 10/949,882

(22) Filed: Sep. 25, 2004

(65) Prior Publication Data

US 2005/0242002 A1 Nov. 3, 2005

Related U.S. Application Data

(63) Continuation-in-part of application No. 10/835,256, filed on Apr. 29, 2004.

(51) Int. Cl.
*B07B 1/28* (2006.01)

(52) U.S. Cl. ............... 209/309; 209/404; 209/413; 209/365.4

(58) Field of Classification Search ........... 209/412, 209/413, 404, 319, 405, 365.4
See application file for complete search history.

(56) References Cited

U.S. PATENT DOCUMENTS

| | | | |
|---|---|---|---|
| 2,089,548 A | 8/1937 | Frantz et al. ............ 210/389 |
| 2,716,493 A | 8/1955 | Hutchison ............ 209/269 X |
| 2,750,043 A | 6/1956 | Thompson ............ 210/340 |
| 2,919,898 A | 1/1960 | Marwil et al. | |
| 2,938,393 A | 5/1960 | Dunn et al. | |
| 3,053,379 A | 9/1962 | Roder et al. | |
| 3,226,989 A | 1/1966 | Robins | |
| 3,605,919 A | 9/1971 | Bromell et al. | |
| 3,659,465 A | 5/1972 | Oshima et al. ............ 74/61 |
| 4,082,657 A * | 4/1978 | Gage ............ 209/311 |
| 4,212,731 A | 7/1980 | Wallin et al. ............ 209/366.5 |
| 4,446,022 A | 5/1984 | Harry ............ 210/388 |
| 4,482,455 A * | 11/1984 | Humphrey ............ 209/319 |
| 4,546,783 A | 10/1985 | Lott ............ 134/109 |

(Continued)

OTHER PUBLICATIONS

Brandt VSM 300 Shaker Brochure, Brandt a Varco Company, 2002, pp. 1-4.*

(Continued)

*Primary Examiner*—Patrick Mackey
*Assistant Examiner*—Mark Hageman
(74) *Attorney, Agent, or Firm*—Guy McClung

(57) ABSTRACT

A vibratory separator having a base, a basket movably mounted on the base and for supporting screen apparatus for treating material introduced into the vibratory separator, the basket on a base and pivotable with respect thereto, vibratory apparatus connected to the basket for vibrating the basket, screen apparatus supported by the basket, the material flowing onto the screen apparatus for treatment, angle adjustment apparatus connected to the basket for adjusting angle of the basket, sensor apparatus for sensing a parameter indicative of basket angle and for providing a signal corresponding to said basket angle, control apparatus for receiving signals from the sensor apparatus and for controlling basket angle based on said signals, the angle adjustment apparatus, in one particular aspect, including a rocker arm assembly with a first pivotable end.

17 Claims, 13 Drawing Sheets

U.S. PATENT DOCUMENTS

| | | | |
|---|---|---|---|
| 4,549,431 A | 10/1985 | Soeiinah | 73/152.49 |
| 4,553,429 A | 11/1985 | Evans et al. | 73/155.21 |
| 4,606,415 A | 8/1986 | Gray, Jr. et al. | |
| 4,634,535 A | 1/1987 | Lott | 210/780 |
| 4,685,329 A | 8/1987 | Burgess | |
| 4,793,421 A | 12/1988 | Jasinski | 175/27 |
| 4,795,552 A | 1/1989 | Yun et al. | 209/319 |
| 4,807,469 A | 2/1989 | Hall | 73/155 |
| 4,809,791 A * | 3/1989 | Hayatdavoudi | 175/40 |
| 4,882,054 A * | 11/1989 | Derrick et al. | 210/389 |
| 4,911,834 A * | 3/1990 | Murphy | 210/167 |
| 4,940,535 A | 7/1990 | Fisher et al. | 209/250 |
| 5,131,271 A | 7/1992 | Haynes et al. | 73/290 |
| 5,190,645 A | 3/1993 | Burgess | 210/144 |
| 5,265,730 A | 11/1993 | Norris et al. | 209/326 |
| 5,273,112 A | 12/1993 | Schultz | 166/374 |
| 5,319,972 A | 6/1994 | Oblak et al. | 73/290 |
| 5,400,376 A * | 3/1995 | Trudeau | 377/21 |
| 5,465,798 A | 11/1995 | Edlund et al. | 175/24 |
| 5,474,142 A | 12/1995 | Bowden | 175/27 |
| 5,570,749 A | 11/1996 | Reed | 175/66 |
| 5,597,042 A | 1/1997 | Tubel et al. | 166/250.01 |
| 5,662,165 A | 9/1997 | Tubel et al. | 166/250.01 |
| 5,706,896 A | 1/1998 | Tubel et al. | 166/313 |
| 5,730,219 A | 3/1998 | Tubel et al. | 66/250.01 |
| 5,732,776 A | 3/1998 | Tubel et al. | 166/250.15 |
| 5,793,705 A | 8/1998 | Gazis et al. | 367/98 |
| 5,896,998 A * | 4/1999 | Bjorklund et al. | 209/326 |
| 5,952,569 A | 9/1999 | Jervis et al. | |
| 5,955,666 A | 9/1999 | Mullins | 73/152.18 |
| 5,992,519 A | 11/1999 | Ramakrishnan et al. | 166/250.15 |
| 6,021,377 A | 2/2000 | Dubinsky et al. | |
| 6,062,070 A | 5/2000 | Maltby et al. | 73/61.49 |
| 6,105,689 A | 8/2000 | McGuire et al. | 175/48 |
| 6,155,428 A | 12/2000 | Bailey et al. | 209/315 |
| 6,173,609 B1 | 1/2001 | Modlin et al. | 73/293 |
| 6,176,323 B1 | 1/2001 | Weirich et al. | 175/40 |
| 6,192,742 B1 | 2/2001 | Miwa et al. | 73/40 |
| 6,233,524 B1 | 5/2001 | Harrell et al. | |
| 6,234,250 B1 | 5/2001 | Green et al. | 166/250.03 |
| 6,237,404 B1 | 5/2001 | Crary et al. | 73/152.03 |
| 6,346,813 B1 | 2/2002 | Kleinberg | 342/303 |
| 6,349,834 B1 | 2/2002 | Carr et al. | 209/366.5 |
| 6,356,205 B1 | 3/2002 | Salvo et al. | 340/853.3 |
| 6,412,644 B1 * | 7/2002 | Crabbe et al. | 209/309 |
| 6,429,653 B1 | 8/2002 | Kruspe et al. | 324/303 |
| 6,438,495 B1 | 8/2002 | Chau et al. | |
| 6,439,391 B1 * | 8/2002 | Seyffert | 209/238 |
| 6,474,143 B1 | 11/2002 | Herod | 73/54.01 |
| 6,484,088 B1 | 11/2002 | Reimer | 701/123 |
| 6,485,640 B2 | 11/2002 | Fout et al. | 210/188 |
| 6,505,682 B2 | 1/2003 | Brockman | 166/250.15 |
| 6,513,664 B1 | 2/2003 | Logan et al. | 209/367 |
| 6,517,733 B1 | 2/2003 | Carlson | 210/785 |
| 6,575,304 B2 | 6/2003 | Cudahy | 209/365.3 |
| 6,581,455 B1 | 6/2003 | Berger et al. | 73/152.55 |
| 6,679,385 B2 | 1/2004 | Suter et al. | 209/367 |
| 6,691,025 B2 | 2/2004 | Reimer | 701/123 |
| 6,715,612 B1 | 4/2004 | Krystof | 209/331 |
| 6,746,602 B2 | 6/2004 | Fout et al. | 210/188 |
| 6,766,254 B1 | 7/2004 | Bradford et al. | 702/9 |
| 6,769,550 B2 | 8/2004 | Adams et al. | 209/399 |
| 6,783,685 B2 | 8/2004 | Huang | 210/690 |
| 6,827,223 B2 | 12/2004 | Colgrove et al. | 209/365.3 |
| 6,838,008 B2 | 1/2005 | Fout et al. | 210/780 |
| 6,868,920 B2 | 3/2005 | Hoteit et al. | 175/25 |
| 6,873,267 B1 | 3/2005 | Tubel et al. | 340/853.3 |
| 6,892,812 B2 | 5/2005 | Niedermayr et al. | 166/250.15 |
| 6,896,055 B2 | 5/2005 | Koithan | 166/250.15 |
| 6,899,178 B2 | 5/2005 | Tubel | 166/313 |
| 2002/0112888 A1 | 8/2002 | Leuchtenberg | 175/48 |
| 2003/0015351 A1 | 1/2003 | Goldman et al. | 175/39 |
| 2003/0220742 A1 | 11/2003 | Niedermayr et al. | 702/9 |
| 2004/0040746 A1 | 3/2004 | Niedermayr et al. | 175/38 |
| 2004/0069690 A1 * | 4/2004 | Musschoot et al. | 209/308 |

OTHER PUBLICATIONS

Varco online catalog "Flowline to Disposal Solutions, Solids Control", 2002, pp. 266-274, www.nov.com/archives/c6Brandt.pdf.*
Brandt LCM-2D LP Installation and Operation manual, 1998, pp. 1-70.*
Mongoose Shaker information, 2003, pp. 1-2, http://www.miswaco.com/New_Technologies/MONGOOSE%20Shaker.cfm.*
The Prodigy Series I Dynamic Control Shaker: Fluid Systems. Inc.: 2 pp.: Apr. 27, 2004.
Brandt Automated Shaker Control. Varco. 1 page, 2002.
PCT/GB2005/050060: PCT Int'l Search Report. 7 pages, mailed Nov. 11, 2005.
PCT/GB2005/050060: PCT Written Opinion of the Int'l Searching Authority; 12 pages, mailed Nov. 11, 2005.

* cited by examiner

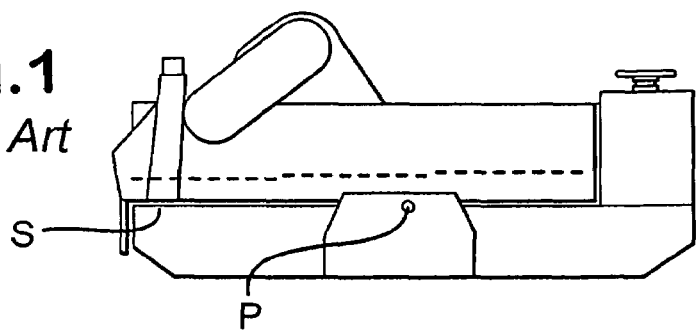
Fig.1 *Prior Art*
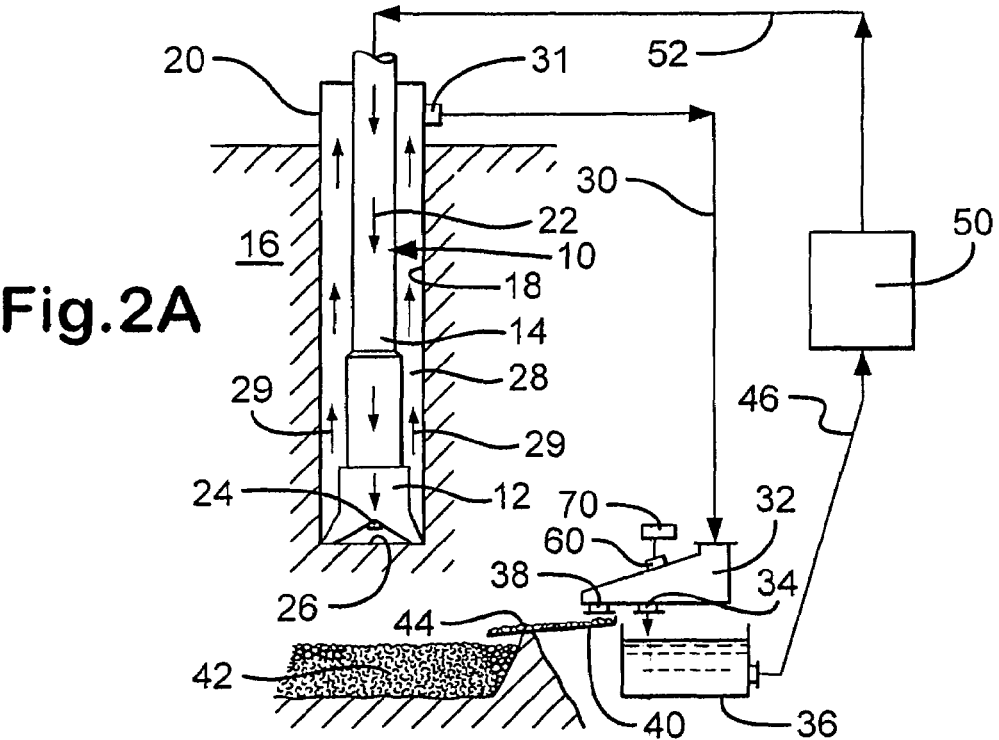
Fig.2A
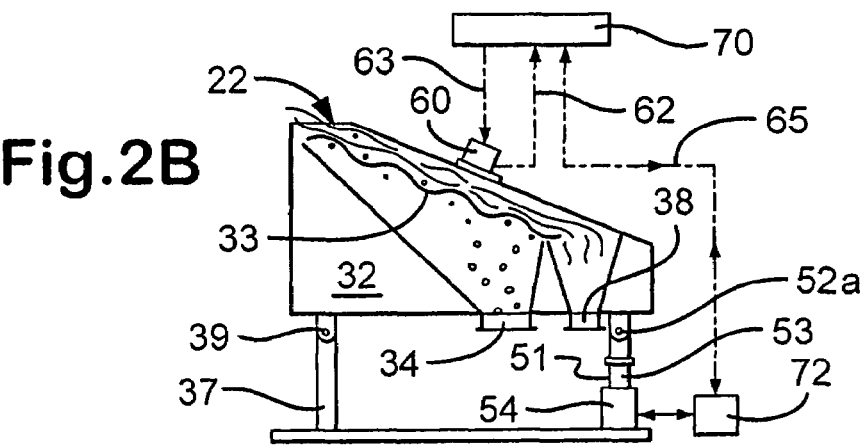
Fig.2B

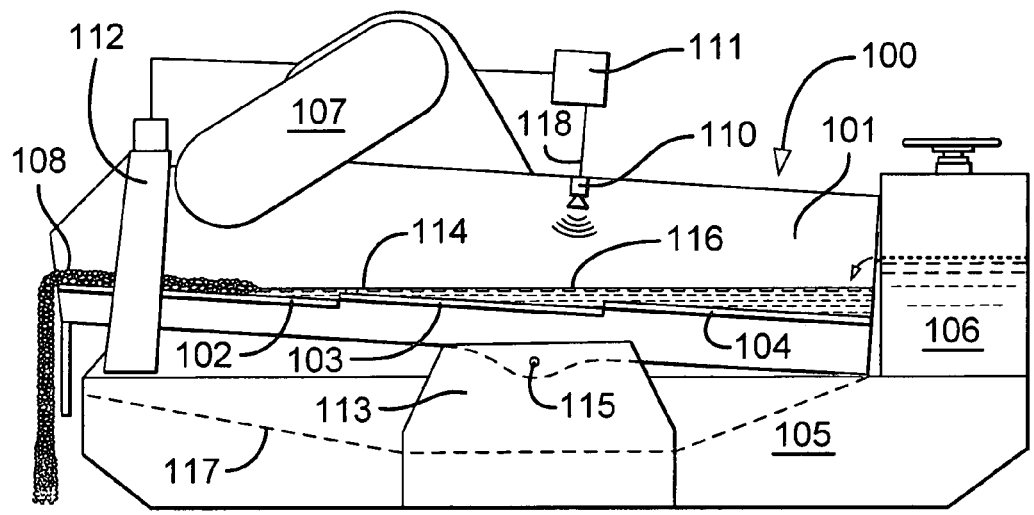
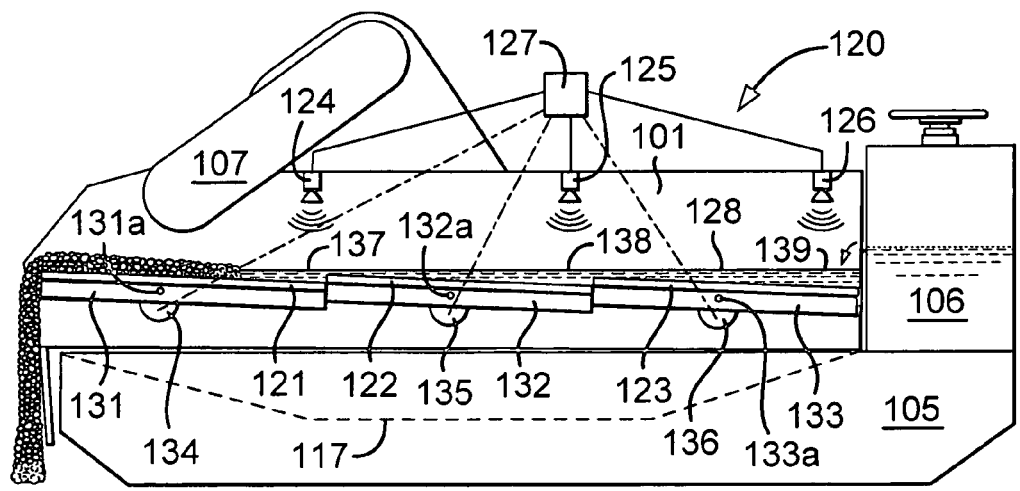

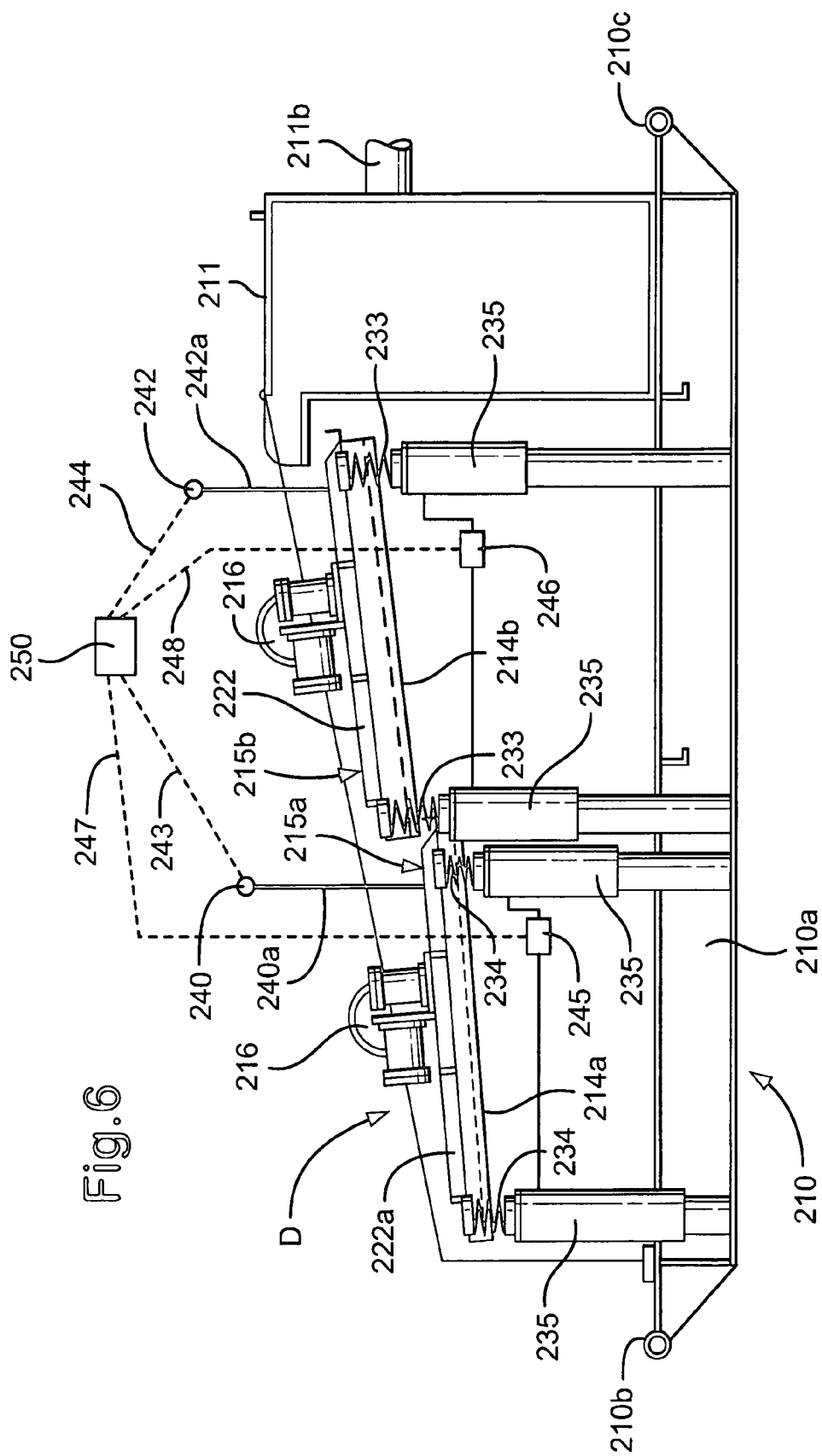

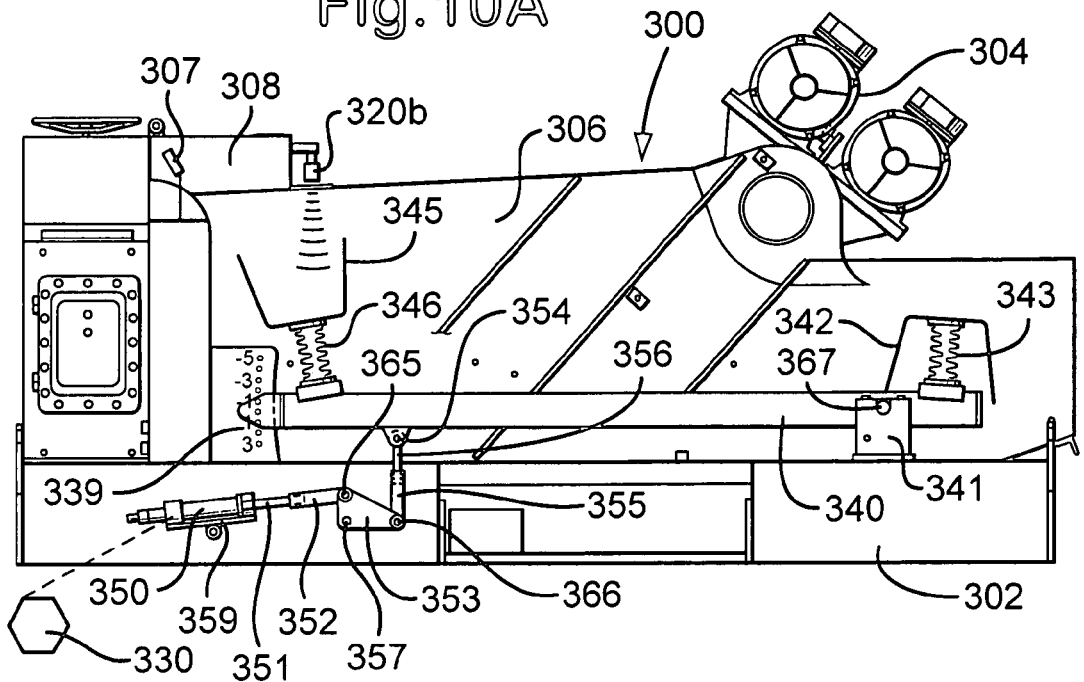
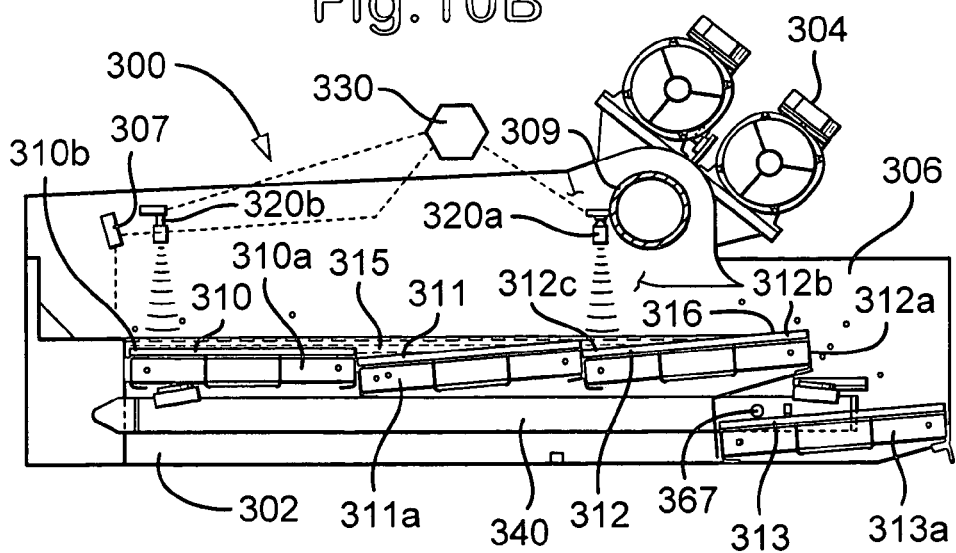

ADJUSTABLE BASKET VIBRATORY SEPARATOR

RELATED APPLICATION

This is a continuation-in-part of U.S. application Ser. No. 10/835,256 filed Apr. 29, 2004, which is incorporated fully herein.

BACKGROUND OF THE INVENTION

1. Field of the Invention

This invention is directed to vibratory separators; to apparatuses and methods for sensing fluid levels in such separators; and to apparatuses and methods for adjusting such levels and for adjusting the extent of a beach area on a screen.

2. Description of Related Art

In many prior art vibratory separators and shale shakers a pool or mass of fluid or material is formed on top of one or more screens or screen assemblies which are used to filter material introduced to the separator or shaker. The depth of this fluid or material can affect efficient operation of the separator or shaker. Fluid or material that is too deep may not be adequately filtered. Fluid or material that is too shallow may flow across a screen too quickly or without sufficient weight to be filtered adequately.

Shale shakers assist in maintaining certain desired properties of drilling fluid by using vibrating screens to remove certain large particles while allowing certain smaller particles to remain in the fluid. The large undesirable particles may include drilling cuttings and debris picked up in the drilling process. The smaller particles may include drilling fluid additives that are required for maintaining desired drilling fluid density and viscosity. The screens on these shakers have a limited life, and can be expensive and time consuming to replace. The shaker is turned off and, preferably, rinsed clean prior to screen replacement.

One factor in screen life is how well the beach area is maintained. "Beach" area is the distance from a fluid-dry interface-with-fluid line on a final screen to the end of the screen. Thus, a zero beach length describes a shaker operating with drilling fluid covering the entire screen area of the final screen and running over to discharge. This can be costly due to the loss of drilling fluid which flows off, rather than through, a screen. A beach length of 20" in certain shakers indicates a shaker operating fairly dry, with the last sections of screen potentially vibrating against completely dry particles. Such dry particles vibrating on the beach of the last screen can tear holes in the screen and shorten the screen life. The beach length is affected by variables such as fluid flow rates and drilling fluid properties including viscosity, density, temperature, and solids content.

In many prior art separators and shakers tilting or raising mechanisms are provided to adjust the angle of screen(s) with respect to the horizontal. For example, a prior art shaker S (shown in FIG. 1) has a tilting mechanism which permits a screen-containing basket to be tilted around a pivot point P up to 5° from the horizontal.

U.S. Pat. No. 4,082,657 discloses a separator apparatus which has individual height adjustable mounting structures for each screen unit which permit adjustment of the screen unit angle with respect to the horizontal.

U.S. Pat. No. 6,575,304 B2 discloses an hydraulic ram apparatus beneath a screen body which is used to adjust the angle of incline of the screen body.

In many prior art systems, a determination of the level of material or fluid on a screen or screen assembly of a separator or shaker is done visually and then adjustments of screen incline angle or of screen support incline angle are done manually.

There has long been a need, recognized by the present inventors, to provide an efficient and accurate measurement of the depth of fluid or material on a screen or screen assembly of a vibratory separator or shale shaker. There has long been a need, recognized by the present inventors, for such separators and shakers with accurate adjustment of such depth based on measurement thereof. There has long been a need, recognized by the present inventors, for a shale shaker or vibratory separator with screen pool depth adjustability to efficiently adjust last-screen beach extent to enhance screen efficiency and to prolong screen life.

SUMMARY OF THE PRESENT INVENTION

The present invention, in certain embodiments, a shale shaker or vibratory separator with a base; a basket movably mounted on the base and for supporting screen apparatus for treating material introduced at a first end of the basket into the vibratory separator, the basket on a base and the first end pivotable with respect thereto, the basket having a second end spaced apart from the first end, material exiting the basket at the second end; vibratory apparatus connected to the basket for vibrating the basket; screen apparatus supported by the basket, the material flowing onto the screen apparatus for treatment; angle adjustment apparatus connected to the basket for adjusting angle of the basket by pivoting the basket's first end; sensor apparatus connected to the vibratory separator for sensing a parameter indicative of basket angle and for providing a signal corresponding to said basket angle; control apparatus for receiving signals from the sensor apparatus and for controlling basket angle based on said signals; and the angle adjustment apparatus including movement apparatus for moving the second end up and down to change basket angle, the movement apparatus controlled by the control apparatus.

The present invention, in certain aspects, discloses a vibratory separator with a base; a basket movably mounted on the base and for supporting screen apparatus for treating material introduced into the vibratory separator, the basket on a base and pivotable with respect thereto; vibratory apparatus connected to the basket for vibrating the basket; screen apparatus supported by the basket, the material flowing onto the screen apparatus for treatment; angle adjustment apparatus connected to the basket for adjusting angle of the basket; sensor apparatus for sensing a parameter indicative of basket angle and for providing a signal corresponding to said basket angle; control apparatus for receiving signals from the sensor apparatus and for controlling basket angle based on said signals; the angle adjustment apparatus including a rocker arm assembly with a first end and a second end, the first end pivotably mounted to the base adjacent and beneath a material input area of the vibratory separator and the second adjacent and beneath a material exit end of the vibratory separator; and the angle adjustment apparatus including movement apparatus with a part thereof in contact with the second end of the rocker arm assembly for moving the second end up and down to change basket angle, the movement apparatus controlled by the control apparatus.

The present invention discloses, in certain embodiments, beach adjustment apparatus for adjusting extent of a beach on a screen of a vibratory separator, the screen mounted to a vibratable basket of the vibratory separator, the beach adjustment apparatus having an end-pivotable basket support for supporting the basket, the end-pivotable basket support pivotable at a pivot end thereof, the end pivotable basket support having a second end spaced-apart from the pivot end, the second end positionable near an exit end of a vibratory separator, apparatus for pivoting the end-pivotable basket support at its pivot end, and the apparatus for pivoting the end-pivotable basket support including movement apparatus for moving the second end of the end-pivotable basket support for facilitating pivoting movement of the end-pivotable basket support to raise and lower the second end to adjust the extent of the beach.

The present invention, in certain embodiments, teaches a vibratory separator (in one particular aspect, a shale shaker) which has sensing apparatus for sensing parameters indicative of the level of fluid or material on a screen or screen assembly supported by the separator and, therefore, for indicating the extent of a beach area on the screen or screen assembly. In one aspect, a screen or screen assembly itself (or a screen on holding structure) is able to be inclined to a desired angle to adjust the extent of a beach area adjacent an exit end of a screen. A beach area is an area adjacent a screen's exit end with two boundary sides—a first side (or rear side) is the side of a pool of material on the screen (analogous to the seashore) and the second side or front side is at or near the exit end of the screen. It is important in some systems to maintain a beach area of desired extent which is sufficiently large so that the pool does not extend to or beyond the screen's exit end—which would result in some material not being treated (filtered, separated) by the screen and simply flowing off the end of the screen. It is also important in some systems to insure that the beach area is not too large which could adversely affect screening efficiency and effectiveness.

In certain aspects, such a separator also has adjustment apparatus (powered electrically, hydraulically, or pneumatically) for receiving information from one or more sensing apparatuses regarding distance to fluid or material at a certain location on a screen or screen assembly (which corresponds to pool depth at the location) and for then adjusting incline angle of the screen or screen assembly to adjust and maintain the extent of a beach area adjacent an exit end of a screen.

In certain aspects, any suitable basket pivot point is used from a basket center to a basket end. In one particular aspect a basket for supporting a screen or screen assembly is positioned and configured so that it pivots at a pivot point relatively near one of its ends; and, in one particular aspect, such a pivot is beneath a rear line which is the rear boundary of a desired beach area ("rear" meaning the beach boundary farthest away from the exit end of a screen).

The present invention, in certain aspects, discloses a shale shaker or vibratory separator with a screen support or basket for supporting screen apparatus for treating material introduced into the vibratory separator, the basket on a base and pivotable with respect thereto; vibratory apparatus connected to the basket for vibrating the basket; screen apparatus supported by the basket, the material flowing onto the screen apparatus and forming a pool on the screen apparatus, and a beach on the screen apparatus adjacent the pool; measurement sensor apparatus connected to the vibratory separator and positioned above the screen apparatus for measuring a distance from the measurement sensor apparatus to a top surface of the pool, the measurement sensor apparatus including a signal production portion for producing signals indicative of said distance and for transmitting said signals; a control system for controlling and in communication with the measurement sensor apparatus for receiving signals from the measurement sensor apparatus indicative of said distance and for processing said signals to calculate a pool depth corresponding to said distance, said pool depth related to a location of an edge of said pool adjacent said beach; and angle adjustment apparatus connected to the basket and controlled by the control system for adjusting angle of the basket, thereby adjusting extent of the beach.

In one particular aspect, a shale shaker according to the present invention consists of a vibrating basket which supports multiple screens. Drilling fluid is directed to flow over the screens from a weir tank. As fluid flows over the screens, drilling fluid and smaller particles pass through the screens and are returned to the drilling fluid system. The larger particles and pieces remain on top of the screens, and vibratory action moves them off an end of the shaker. Within the shaker, the angle at which the basket sits can be changed to maintain the desired beach area. One or more ultrasonic transducer sensor measuring apparatuses mounted above a screen or screens, (in one aspect above the last screen) measures the fluid level on screen(s) or on the last screen. In one particular aspect a single sensor is used above the pool above a last screen which is a pool area that is less turbulent than previous screen areas and, in one aspect, a basket pivot point is located beneath a beach's rear line so that the single sensor provides all needed information to adjust beach extent as desired. The level of the fluid on the screen(s) is related to the rear or inner beach boundary. A signal from the sensor(s) indicative of sensor-to-pool-surface distance is sent to a control system, e.g. a computerized control system, a programmable logic controlled control system, a digital signal processor and/or a microprocessor based control system which interprets the signal and sends a control signal to a height adjustment apparatus, e.g., but not limited to, a system with a directional control valve which controls pressurized hydraulic fluid flow to pistons attached via linkages between the shaker base and basket and/or any basket raising apparatus (mechanical, pneumatic, or hydraulic; e.g. but not limited to hydraulically-powered piston/cylinder apparatuses) of the prior art. In certain aspects, multiple distance measurements are made and the controller is programmed to average the measurements. As the basket is raised or lowered, the basket angle changes. When the beach width is too long, the height adjustment apparatus decreases the angle of the basket, and when the beach width is too short, the angle of the basket is increased. Thus, the desired beach extent is automatically maintained. A desired sensor-to-pool-surface distance, and thus a desired beach width can be programmed into the control system for a particular separator, shaker, screen, or screen assembly.

In one particular aspect a power system for providing hydraulic fluid under pressure to apparatus for raising and lowering a basket uses double rod hydraulic cylinders so that dual apparatuses on two sides of a basket operate in unison. One or more sensors may be connected to or over a basket, to a rear tank, to a skid or base, or to a motor tube or mount. In one aspect a fluid reservoir (hydraulic fluid or gas) and/or fluid pump apparatus is part of a vibratory separator system or part of a shale shaker. In one particular aspect, a skid, base, or support of a shaker or part of a shaker supports a fluid reservoir; and pump apparatus on the shaker provides fluid to height adjustment apparatus.

In certain aspects a fluid flow sensor is employed on a vibratory separator or shale shaker which gives an indication when the flow of material ceases so that a basket end near a material input point can be lowered so that upon recommencement of the material flow the basket angle is such that material does not flow off a last screen's exit end without being treated.

In certain aspects the present invention provides a vibratory separator (e.g. but not limited to a shale shaker) with a basket for supporting screen apparatus for treating material introduced into the vibratory separator, the basket on a base and pivotable with respect thereto; vibratory apparatus connected to the basket for vibrating the basket and the screen apparatus in the basket; screen apparatus supported by the basket, the material flowing onto the screen apparatus and forming a pool on the screen apparatus, and a beach formed on the screen apparatus adjacent the pool; measurement sensor apparatus connected to the vibratory separator and positioned above the screen apparatus for measuring a distance from the measurement sensor apparatus to a top surface of the pool, the measurement sensor apparatus including a signal production portion for producing signals indicative of said distance and for transmitting said signals; a control system for controlling and in communication with the measurement sensor apparatus for receiving signals from the measurement sensor apparatus indicative of said distance and for processing said signals to calculate a pool depth corresponding to said distance, said pool depth related to a location of an edge of said pool adjacent said beach; and angle adjustment apparatus connected to the basket and controlled by the control system for adjusting angle of the basket, thereby adjusting extent of the beach.

What follows are some of, but not all, the objects of this invention. In addition to the specific objects stated below for at least certain preferred embodiments of the invention, there are other objects and purposes which will be readily apparent to one of skill in this art who has the benefit of this invention's teachings and disclosures. It is, therefore, an object of at least certain preferred embodiments of the present invention to provide new, unique, useful, and non-obvious systems and methods of their use—all of which are not anticipated by, rendered obvious by, suggested by, or even implied by any of the prior art, either along or in any possible legal combination; and it is, therefore, an object of at least certain preferred embodiments of the present invention to provide:

New, useful, unique, efficient, non-obvious vibratory separators and shale shakers and methods of their use;

Such separators and shakers with one or more sensing apparatuses for sensing parameters indicative of the depth of fluid or material on screen(s) or screen assemblies supported by the separator or shaker, which depth is related to the extent of a beach area on the screen(s) or screen assemblies;

Such separators or shakers with a screen support which is pivotable at or near one of its ends for screen inclination angle adjustment thereby adjusting beach area;

Such separators or shakers with adjustment apparatus for adjusting screen inclination angle based on information received from the sensing apparatus or apparatuses;

Such separators or shakers with sensor(s) to sense sensor-to-pool-surface distance on screen(s) and to automatically adjust said distance to maintain a desired beach extent on a screen; and, in one aspect, on a last or material-exit screen; and, in one aspect, a single sensor which, in certain embodiments, is located above a basket pivot point;

Such separators or shakers with material flow sensing apparatus so that basket angle can be adjusted and readjusted depending on the material flow status; and New, useful, unique, efficient, non-obvious beach adjustment apparatus for adjusting beach extent on a screen of a vibratory separator or shake shaker.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly from a cursory inspection or review the nature and general area of the disclosure of this invention. The Abstract is neither intended to define the invention, which is done by the claims, nor is it intended to be limiting of the scope of the invention in any way.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

FIG. 1 is a schematic side view of a prior art shale shaker.

FIG. 2A is a schematic view of a system according to the present invention. FIG. 2B is a schematic side view of shale shaker apparatus of the system of FIG. 2A.

FIGS. 3, 4, 5B and 6 are side schematic views of systems according to the present invention.

FIG. 10A is a side view of a shale shaker according to the present invention. FIG. 10B is a side cross-section view of the shaker of FIG. 10A.

DESCRIPTION OF EMBODIMENTS PREFERRED AT THE TIME OF FILING FOR THIS PATENT

Figure 5A:
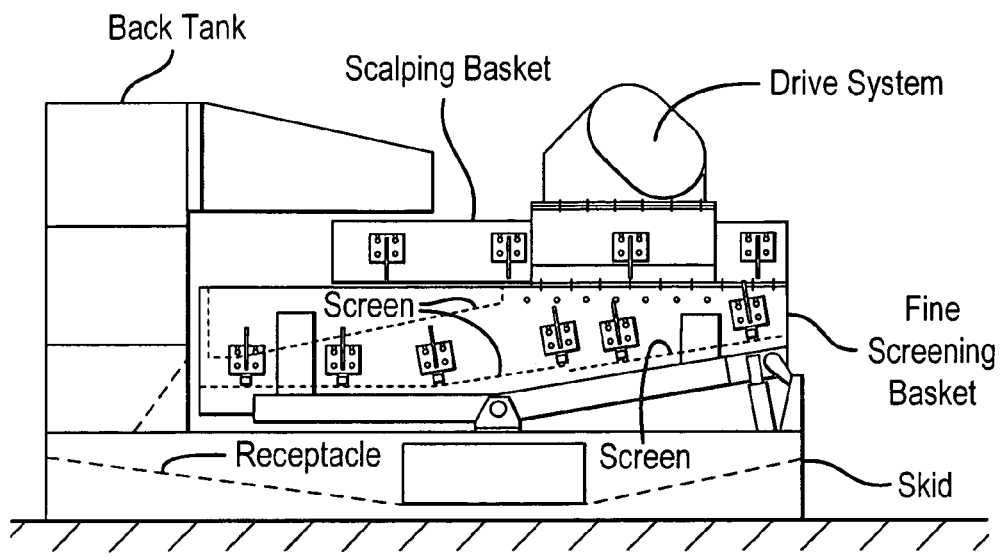
FIG. 5A is a schematic view of a prior art shale shaker.

Referring now to FIGS. 2A and 2B, a drilling system 10 according to the present invention includes a rotary bit 12 attached to the lower end of a length of hollow drill pipe 14 suspended from a drilling derrick (not shown).

The drill pipe 14 and attached drill bit 12 are rotated to cut into the subsurface formation 16 to form a wellbore 18. The drill pipe 14 passes through a wellhead assembly 20 located at the surface. The wellhead assembly 20 controls flow of drilling fluid into the well. During the drilling of the well, a drilling fluid 22 commonly referred to as drilling mud is pumped down the interior of the hollow drill pipe 14. The drilling mud exits jets such as jet 24 in drill bit 12 and impinges upon a bottom 26 of the well bore 18. The drilling fluid exiting the jets 24 flushes away from the bottom 26 of the wellbore 18 the cuttings or particles generated as the drill bit 12 cuts into the earthen formation 16. A stream of drilling mud 22 then carries the cuttings and particles upward through a well annulus 28 (arrows 29) to the wellhead 20. The drilling mud 22 with the particles and cuttings carried or suspended therein, exits the wellhead 20 at outlet 31 and passes through a conduit 30 to a shaker system according to the present invention which includes a shale shaker 32.

In the shaker 32, the drilling mud and particles are deposited upon one or more screens which are vibrated so that the larger particles are sifted out of the drilling mud and carried off the top of the screen(s).

A liquid portion of the drilling mud along with very fine suspended particles exits a first shaker outlet 34 and is received in a mud pit 36.

Larger particles 44 which are sifted out of the stream of drilling mud exit a second shaker outlet or trough 38 and are conveyed on a conveyor or slide 40 for deposit into a reserve pit 42 or into storage tanks for haulage to another location. The drilling mud is pumped from the mud pit 36 through a line 46 by a mud pump 50. The mud pump 50 then pumps the mud through a discharge line 52 which returns it to the interior bore of drill pipe 14.

As shown in FIGS. 2A and 2B the shale shaker 32 has a fluid level sensing apparatus 60 which is in communication with a control apparatus 70. The sensing apparatus 60 senses a distance to a top surface of the drilling mud 22 on a screen 33 of the shaker 32, which is indicative of mud depth. Via a signal transmission line 62 (or multiple such lines if needed) the sensing apparatus sends a signal to the computer apparatus 70 indicative of this distance. The apparatus 70 controls the sensing apparatus 60 via a line 63 (or multiple such lines if needed).

The shale shaker 32 (or a screen supporting basket thereof) is supported by a first support 37 which has a pivotal connection 39 and by a second support 51 which has a pivotal connection 52a and a movable post 53 which is selectively movable up and down by moving apparatus 54 to pivot the shale shaker 32 (or its basket alone) on the pivotal connection 39 to affect the angle of the shaker or basket 32, the depth of drilling fluid beneath the sensing apparatus 60, and the extent of a beach area on the screen 33. Via a line 65 the computer apparatus 70 controls a control apparatus 72 that selectively operates the moving apparatus 54 (which may be pneumatically, hydraulically or electrically powered as may be any such apparatus or height adjustment apparatus of any system according to the present invention).

The sensing apparatus 60 may be (and as may be the case for any sensor of any system disclosed herein) any suitable known level and/or distance sensing apparatus including, but not limited to, the following types: electrical, optical, electromagnetic, ultrasonic, acoustic, and pulse-echo, and may be like the level sensing systems disclosed in U.S. Pat. Nos. 6,691,025 B2; 5,793,705; 5,319,972; 6,484,088 B1; 6,062,070; and 5,131,271 (all said patents incorporated fully herein for all purposes) and the systems referenced, referred to or mentioned in these patents. The apparatus 70 may be (and as may be for any system disclosed herein) any suitable computer, computers, computer system, microprocessor-based system and/or programmable logic controller(s).

FIG. 3 shows a shale shaker 100 according to the present invention which has a basket 101 vibrated by interconnected vibrating apparatus 107. The basket 101 supports three screens 102, 103, 104 for treating material introduced onto screen 104 from a tank 106.

An ultrasonic level sensor 110 is connected to the basket 101 and selectively senses the distance to, and, therefore the level of the material 114 (e.g., drilling fluid with solids entrained therein) at a location 116 above the screen 103. A control apparatus 111 controls the sensor 110 via a cable 118 and also, via the cable 118, the sensor 110 sends signals to the control apparatus 111 indicative of a measurement of the level at the location 116. In one aspect the control apparatus 111 includes suitable apparatus (e.g. like the apparatus 70 described above) which calculates the depth at the location 116 and, based on suitable programming in suitable programming media in the control apparatus 111, adjusts the inclination of the basket 101 using adjustment apparatus 112 so that the depth at the location 116 is maintained at a desired level.

In one aspect the basket 101 is pivotally connected to a support 113 at a pivot point 115. The support 113 is secured to a base 105, as is the tank 106 and adjustment apparatus 112. Fluid and/or solid material flowing through the screens 102-104 flows down into a receptacle 117. Separated material 108 flows off an exit end of the last screen 102.

FIG. 4 shows a shale shaker 120 according to the present invention similar to the shale shaker 100, FIG. 3 (and like numerals indicate like parts); but the shale shaker 120 has individual tilting mechanisms 131, 132, 133 (each with a respective pivot point 131*a*, 132*a*, 133*a*) each beneath a respective screen 121, 122, 123. Levels of drilling fluid 128 at various locations on the screens 121-123 can be adjusted by selectively changing the inclination of the screens 121-123. Control apparatuses 134-136 correspond, respectively, to the mechanisms 131-133. A control system 127 with suitable control apparatus (e.g. like the apparatus 70, FIG. 2B) communicates with the control apparatuses 131-133 and also with individual level sensors 124, 125, and 126. Each sensor 124-126 senses the level of drilling fluid 128 at, respectively, locations 137, 138 and 139. The control apparatus in one aspect is pre-programmed to maintain the drilling fluid levels at locations 137-139 at predetermined levels by monitoring the levels with the sensors 124-126 and adjusting the depths at those locations by pivoting the screens 121-123 by pivoting the individual tilting mechanisms 131-133. Any one or any two of the sensors 124-126 may be deleted and the corresponding tilting mechanism(s) and associated control(s) may be deleted.

Figure 5B:
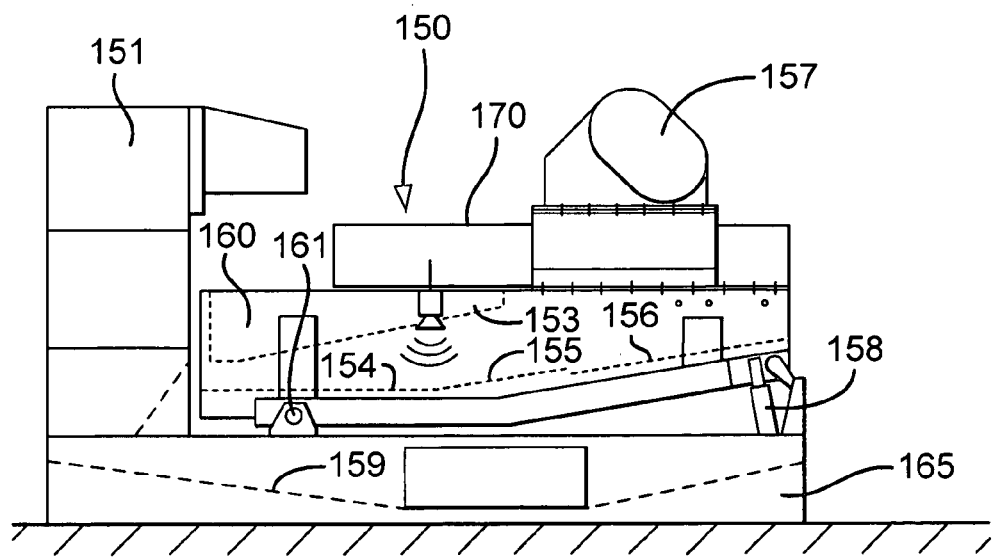

FIG. 5A shows a prior art shale shaker with a pivot point at or near a mid-point of a shaker basket ("fine screening basket"). FIG. 5B shows a shale shaker 150 according to the present invention which has a basket pivot point 161 at or near one end of a basket 160. The shaker 150 has a back tank 151 from which material to be treated flows into a scalping basket 170 which removes massive and/or gross size pieces and particles and from which material then flows down onto screens 153-156. Height adjustment apparatus 158 (controlled as is any adjustment apparatus disclosed herein) selectively pivots the basket 160 about the point 161. Vibrating apparatus 157 vibrates the basket 160. Material passing through the screens flows into a receptacle 159 on a skid 165.

In one aspect the present invention provides a separator like that disclosed in U.S. Pat. No. 4,082,657 (incorporated fully herein for all purposes); but with improvements according to the present invention. As shown in FIG. 6 a separating device D according to the present invention for separating particulate from a fluid stream includes a frame 210 having mounted thereon an inlet tank 211 for receiving a fluid to be filtered or cleaned. Screen units 214*a* and 214*b* are mounted in cascaded alignment on the frame 210 by vibration mount means generally designated as 215*a* and 215*b* which each includes a vibrating means 216 mounted therewith for vibrating screen units 214*a* and 214*b* simultaneously.

The frame 210 includes first and second side members 210*a* (only one is illustrated) which are connected together by a front end connecting rod 210*b* and a rear connecting rod 210*c*. The front and rear connecting rods 210*b* and 210*c* cooperate with the side members such as 210*a* to provide a generally rectangular form having an opening therethrough through which the cleaned fluid stream may pass to a recovery area positioned therebelow. The side frame members such as 210*a* may be I-beams or other suitable frame members for supporting the structure to be disclosed here.

The inlet tank 211 has connected therewith an inlet line 211*b* for receiving the fluids to be cleaned. In one aspect the screen unit 214*a* and 214*b* includes a metal frame with screening material thereon.

The screen units are releasably mounted in screen unit mounting assembly supports 222 and 222*a*.

Each screen unit is supported by four adjustable posts 235 (two shown on each side of each screen; e.g. as described in U.S. Pat. No. 4,082,657). Optionally, interposed between the screen units' supports 222, 222*a* are spring mechanisms 233 and 234. Vibratory apparatuses 216 vibrate the screen units.

A sensor 240 on a support 240*a* senses the depth of fluid on the screen unit 214*a* and a sensor 242 on a support 242*a* senses the depth of fluid on the screen unit 214*b*. A control apparatus 250 (like any disclosed herein) is in signal communication with the sensors 240, 242 via cables 243, 244. The control apparatus 250 is also in communication via cables 247, 248 with control apparatuses 245, 246 which control the height-adjustable posts 235. The control apparatuses 250, 245, 246 may be like any control apparatus and/or computer apparatus described above.

Figure 7:
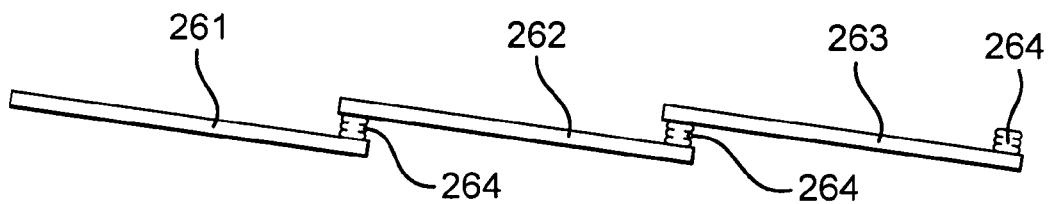
FIG. 7 is a side schematic view of screen assemblies according to the present invention.

FIG. 7 shows three screen assemblies 261, 262, 263 according to the present invention which may be used in any system according to the present invention in which screen assemblies, screens, or individual screen supports are tilted or moved to adjust fluid depth at a location on a screen assembly or screen. Each screen assembly 261-263 has an expandable member 264 (e.g., but not limited to, an expandable bellows or seal) which insures that sealing contact is maintained between adjacent screen assemblies (or between a screen assembly end and a member on a basket against which a screen assembly end abuts). In one aspect as shown the expandable members 264 are bellows seals; but it is within the scope of this invention for any suitable seal or sealing material to be used which can expand and contract sufficiently to maintain a seal between adjacent screens.

Figure 8A:
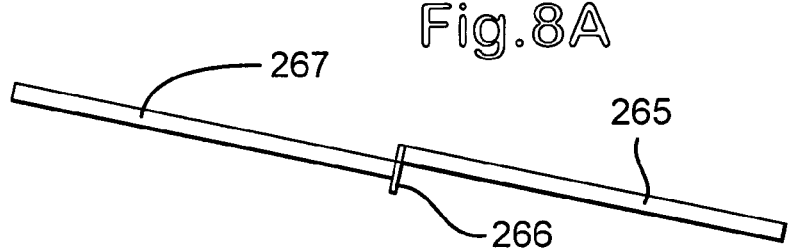
FIG. 8A is a side schematic view of a screen assembly according to the present invention.
Figure 8B:
FIGS. 8B and 8C are end views of a screen assembly of FIG. 8A.
Figure 8C:
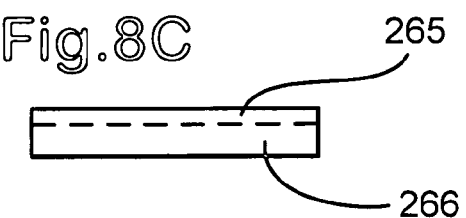

FIGS. 8A-8C illustrate a screen assembly 265 according to the present invention which has a flexible end seal 266 which seals against an end of an adjacent screen 267. The seal 266 is sufficiently wide that it will seal against the end of the screen assembly 267 when the inclination of the screen assembly 267 is changed (and/or when the inclination of the screen assembly 265 is changed (e.g. in response to a signal from a fluid level sensor above either or both screen assemblies 265, 267. Optionally, the screen assembly 267 may also have an end seal 264.

Figure 9:
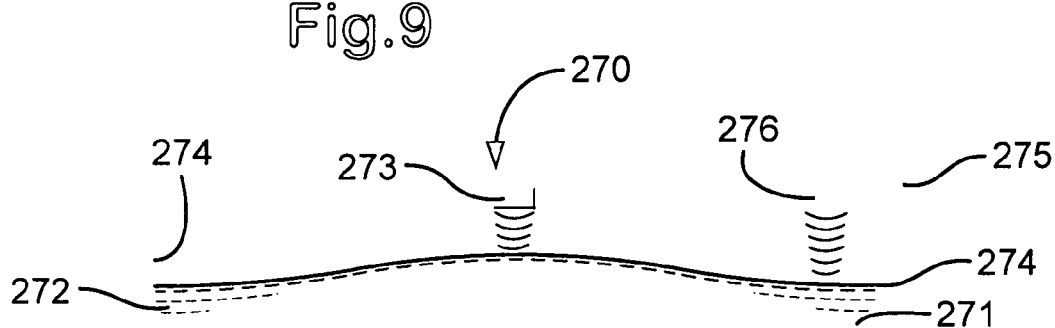
FIG. 9 is an end view of a system according to the present invention.

FIG. 9 shows a vibratory separator 270 according to the present invention with walls 274 and a screen assembly 271 in a crowned configuration with fluid 272 to be treated thereon. A fluid level sensor 273 connected to a wall 274 of the separator 270 with a connector 275 senses fluid level near a center point of the screen assembly 271 (as viewed in FIG. 9). A fluid level sensor 276 senses fluid level near the wall 274. It is within the scope of the present invention to locate fluid one or more sensors at any point above a screen assembly in a vibratory separator or shaker. Optionally, either sensor 273 or 276 may be deleted.

FIGS. 10A-10D show a shale shaker 300 according to the present invention which is like a King Cobra Shale Shaker commercially available from Varco International, Inc., but which has improvements according to the present invention. The shale shaker 300 has a skid or base 302 on which is a basket 306 which is vibrated by vibration apparatus 304. From a weir tank 308 fluid, e.g. drilling fluid with drilled cuttings and debris therein, flows onto a first screen 310 which is supported by a screen support 310*a* connected to the basket 306. Part of the fluid then flows onto a second screen 311 supported by a screen support 311*a* connected to the basket 306 and then part of the fluid flows onto a last screen 312 supported by a screen support 312*a* connected to the basket 306. Part of the fluid flows off an exit end 312*b* of the screen 312 onto an optional lower screen 313 which is supported by a screen support 313*a* connected to the basket 306.

The fluid forms a pool 315 above the screens 310-312. Depending on the fluid, on the fluid viscosity, on the fluid's solids content, on the rate of fluid flow, and the through-put of the screens, a beach 316 is created at the exit end 312*b* of the screen 312. It is desirable to optimize the extent of this beach 316 and, in certain aspects, it is preferred that the beach, as viewed in FIG. 10B, be sufficiently large that no fluid flows untreated off the last screen 312.

An ultrasonic transducer sensor measurement apparatus 320 is connected to the basket 306 (e.g. to a motor tube 309 and/or such a sensor apparatus 320b is connected to a weir tank 308) and is, optionally, positioned above the pool 315, e.g. over an entry end 310b of the screen 310 or over an entry end 312c of the screen 312. Such locations for the apparatus 320 provide measurement at locations providing the greatest range of pool depth and therefore, the greatest range for adjusting beach extent; i.e., such a location insures that the apparatuses 320a and/or 320b will have a sensor-to-pool-surface distance to measure since in most cases there will be fluid at some depth at this point beneath the apparatus or apparatuses 320. The apparatuses 320a and/or 320b are in communication with a control apparatus 330. The sensor apparatuses generates a signal indicative of sensor-to-pool distance which indicates depth of the pool 315 beneath the sensor apparatus(es). Optionally, either the sensor 320a or the sensor 320b is deleted.

The control apparatus 330 selectively controls a control valve 336 which allows hydraulic fluid under pressure from a reservoir 338 pumped by an hydraulic pump 337 to move to and from two hydraulic cylinder apparatuses (one shown, FIG. 10A) which are on opposite sides of the shaker 300. A flow control valve 332 controls the flow of fluid into/out of the pistons and adjusts the rate of stroke in the cylinder apparatuses 333, 334 and a flow control valve 335 limits the flow of fluid to/from the pistons and adjusts the rate of stroke out of the cylinder apparatuses 333, 334. An hydraulic cylinder apparatus 350 has an extendable piston 351 pivotably connected to a pivot plate 353 at a pivot point 365. The plate 353 is pivotably connected at a pivot point 357 to the basket 306. A housing 350 of the apparatus 334 is secured to a mount 359 which is pivotably connected to the basket 306. A link 355 is pivotably connected to the plate 353 at a pivot point 366 and the link 355 is connected to a link 356 that is pivotably connected at a pivot point 354 to a basket support 340. The basket support 340 is supported by the hydraulic cylinder apparatuses and by bases 341. Shafts 367 of the basket supports 340 are pivotably mounted on the bases 341. A scale 339 indicates the angle of the support 340 with respect to horizontal (i.e. assuming the skid or base 302 is level). The support 340 is connected to springs 346, 343 which support basket mounts 345 and 342, respectively; and similar springs and mounts are on the other side of the basket.

In another aspect the plate 365 is deleted and the hydraulic cylinder apparatuses are oriented almost vertically and the hydraulic cylinder apparatuses' pistons 351 are pivotably connected to the basket support 340 for selectively raising and lowering it to adjust beach extent.

Figure 10C:
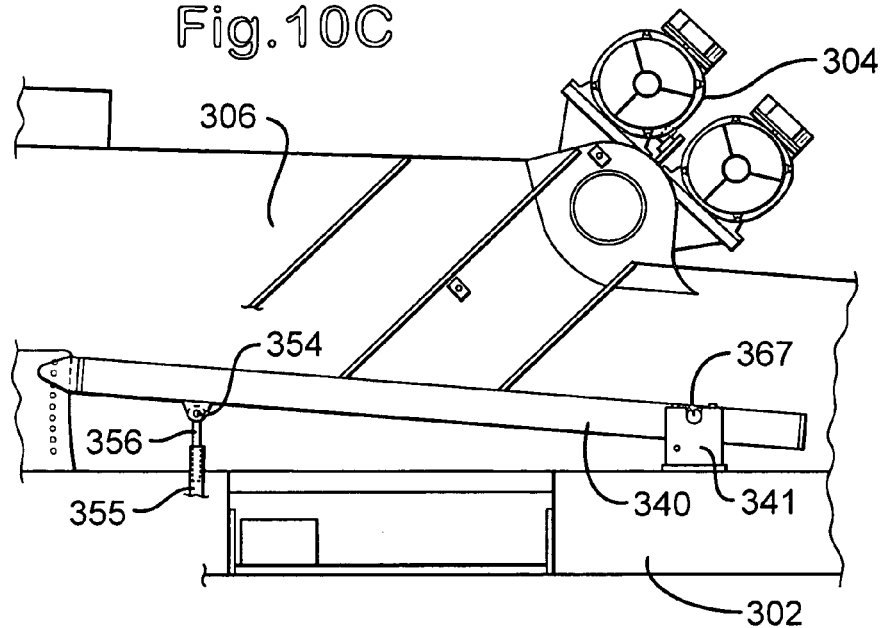
FIG. 10C is a side cross-section view which shows the shaker of FIG. 10A with its basket tilted.
Figure 10D:
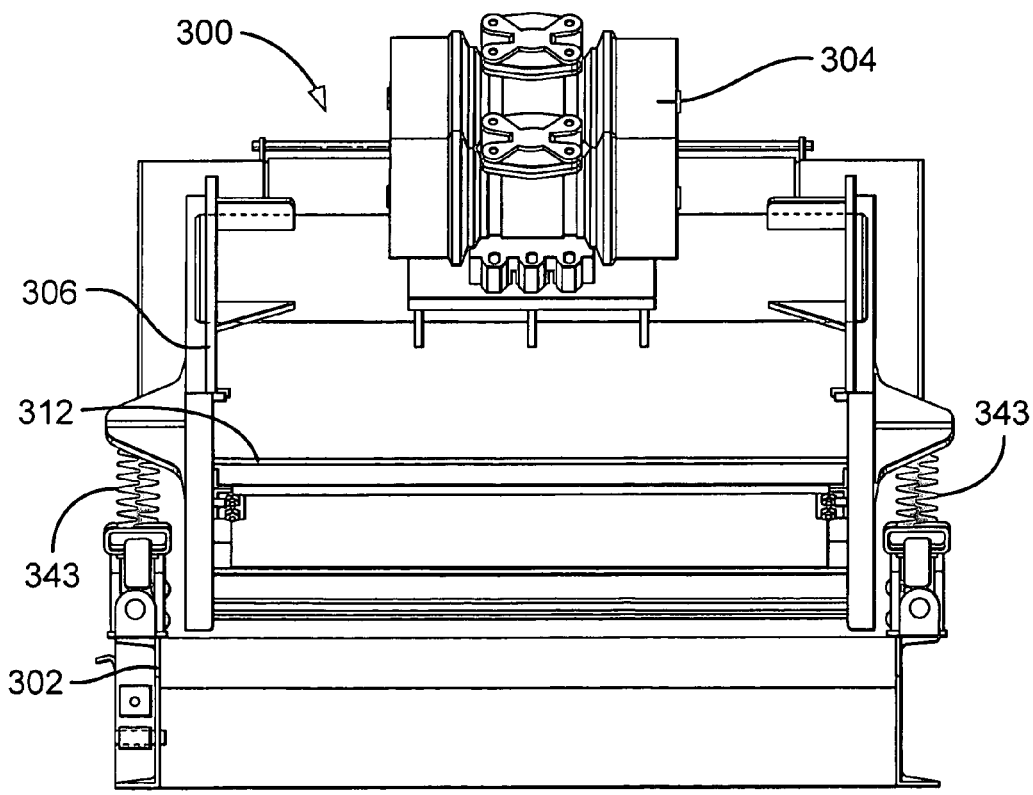
FIG. 10D is a front end view of the shaker of FIG. 10A.
Figure 10E:
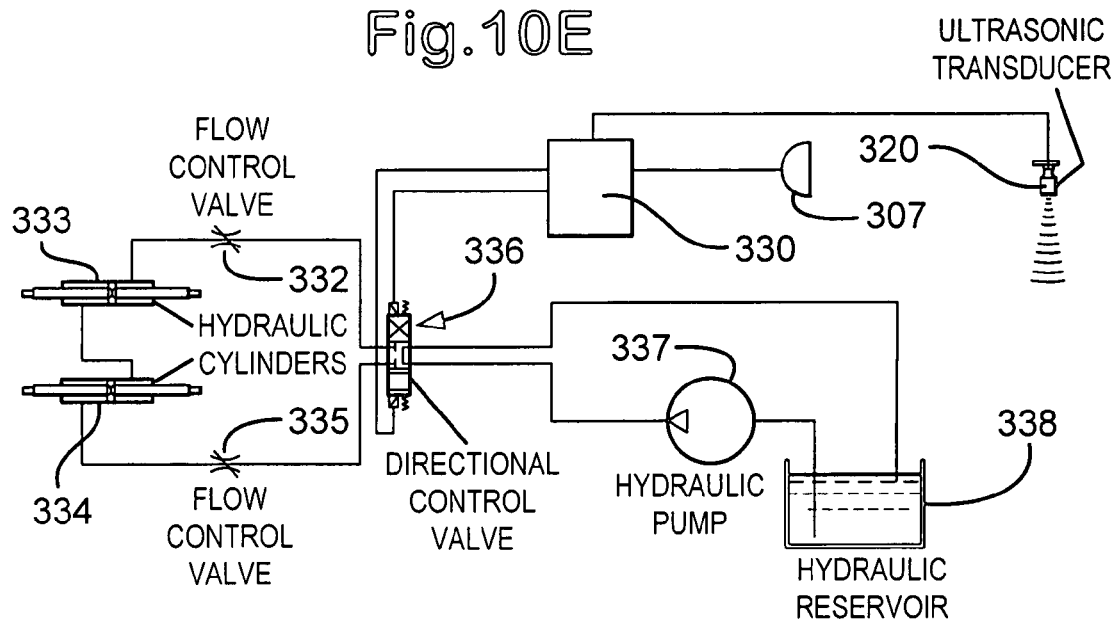
FIG. 10E is a schematic diagram of a control apparatus for the shaker of FIG. 10A.

FIG. 10C shows the basket 306 tilted as compared to the basket 306 as shown in FIG. 10A.

In one aspect a vibratory separator or shale shaker according to the present invention may employ a material flow sensor which produces a signal indicative of the presence or absence of material flowing onto screen apparatus; e.g., but not limited to, drilling fluid with drilled solids flowing onto screen apparatus of a shale shaker. Such an indication is valuable in insuring that, upon flow commencing again following cessation of material flow which is common when drilling is stopped, a screen or a basket is not inclined at such an angle that a relatively low depth pool is formed resulting in the loss of untreated drilling fluid flowing off a screen exit end. By adjusting screen or basket angle so that flow recommencement is accommodated, a pool is formed of sufficient depth and extent that all or the great majority of material is treated and an optional amount of drilling fluid flows through the screen and is recovered.

Optionally, a shaker 300 as shown in FIGS. 10A and 10B (with or without a sensor or sensors like the sensor 320a and/or 320b) has a material flow switch device 307 connected to vibratory separator adjacent a material input tank like the tank 308 for sensing when material is flowing. The device 307 may be any suitable known flow sensor apparatus, including, but not limited to paddle switch systems, including, but not limited to, FS-550 Series paddle switches from Gems Sensors Co.

The device 307 is in communication with and controlled by the controller 330 and, in one aspect, signals from the device 307 override signals from sensors like the sensors 320a and 320b so that the controller 330 knows that material flow has ceased (rather than an indication from the sensors 320a, 320b that the pool is very shallow). In response to signals from the device 307 the controller 330 can activate the apparatus for adjusting basket angle.

Once material flow into the basket is again proceeding, the controller 330 (acting upon signals from the sensor 320a and/or the sensor 320b) adjusts the basket angle to maintain the desired beach extent. Although one particular flow sensor has been mentioned, it is to be understood that any suitable known flow sensor device or system may be used, including, but not limited to, ultrasonic transducer systems.

The controller 330 may be any suitable known commercially available controller apparatus, including, but not limited to computerized systems, digital signal processor systems, programmable logic controller systems, and/or microprocessor systems. One suitable sensor apparatus and associated control system is the model XPS-10 and Hydro Ranger 200 from Siemens.

Figure 10F:
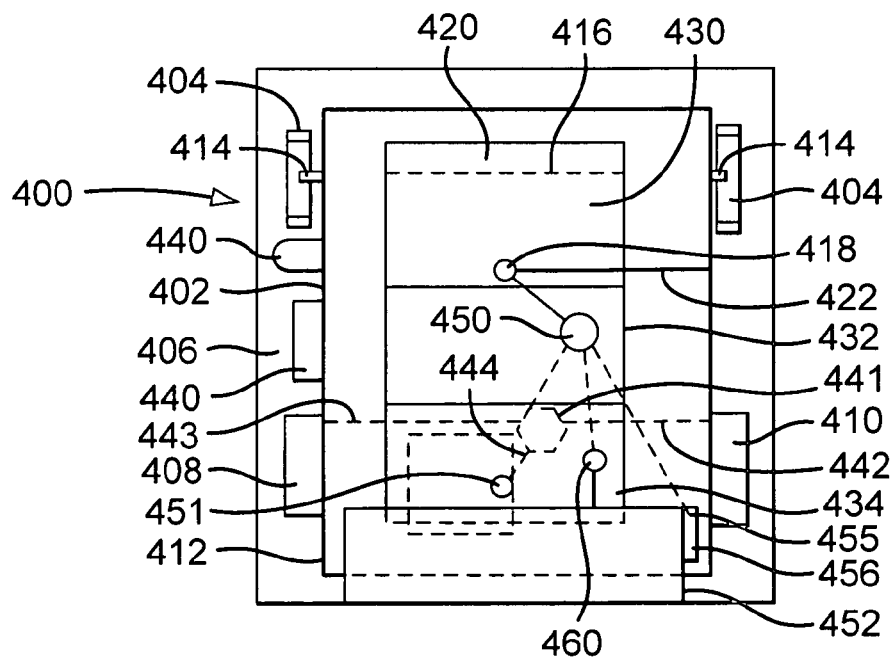
FIG. 10F is a top schematic view of a vibratory separator according to the present invention.

FIG. 10F shows schematically a vibratory separator or shake shaker 400 according to the present invention which has a screen-supporting basket 402 with pivot members 414 pivotally mounted on supports 404 on a skid or base 406. Adjustment apparatuses 408, 410 on either side of the basket 402 (like any adjustment apparatus described herein) raise and lower an end 412 of the basket 402, pivoting it about the pivot members 414. In one aspect a rear line 416 of a beach area 420 of a screen 430 supported in the basket 402 coincides with a line between the pivot members 414.

A sensor 418 (like any sensor disclosed herein, including but not limited to those in FIGS. 1-10A) is positioned above a fluid entry end of the screen 430 on a connecting member 422 connected to the basket 402. A sensor 451 (like any sensor herein) is positioned above a fluid entry end of the screen 434 and may be conveniently connected to a bar or beam which is connected to the tank 450 and/or to the basket 402. Material flows from a screen 432 to the screen 430 and from a screen 434 to the screen 432. Any suitable tank 452 and/or fluid introduction apparatus may be used. Vibrating apparatus 440 vibrates the basket 402.

A power apparatus 441 connected to the shaker 400 powers the adjustment apparatuses 408, 410 and may be located at any suitable location on the shaker 400 including, but not limited to, on the basket 402 or on the skid 406. Optionally the power apparatus 441 is any such apparatus or system disclosed herein. In one aspect the power apparatus 441 includes an hydraulic pump in fluid communication with an hydraulic fluid reservoir 440 via a line 444 and the apparatuses 408, 410 are hydraulically-powered apparatus in fluid communication with the pump via lines 442, 443.

Control apparatus 450 (as any disclosed herein) controls the apparatus 441, the sensor 418, a sensor 460, a controller 456, and/or the sensor 451. Optionally, a material flow sensor 460 connected to the tank 452 (or at any suitable location in the separator 400) which is like the sensor 307, FIG. 10A, senses the presence or absence of material flowing from the tank 452 onto the screen 434. The sensor 460 is in communication with the control apparatus 450 and, in response to signals from the sensor 460, the control apparatus 450 adjusts the basket angle to accommodate material flow and to adjust for recommencement of flow following flow cessation. Optionally, a flow rate controller 456 controls the amount of fluid introduced onto the screen 434 from the weir tank 452 and a control switch 455 of the controller 456 is in communication with the control apparatus 450.

It is within the scope of this invention for the apparatuses 408, 410 to be located at any desirable effective location with respect to the basket, as may be the case with any adjustment apparatus disclosed herein.

The present invention, therefore, in some and not necessarily all embodiments, provides a vibratory separator having a screen support or basket for supporting screen apparatus for treating material introduced into the vibratory separator, the basket on a base and pivotable with respect thereto, vibratory apparatus connected to the basket for vibrating the basket, screen apparatus supported by the basket, the material forming a pool on the screen apparatus, and a beach on the screen apparatus adjacent the pool, measurement sensor apparatus connected to the vibratory separator and positioned above the screen apparatus for measuring a distance from the measurement sensor apparatus to a top surface of the pool, the measurement sensor apparatus including a signal production portion for producing signals indicative of said distance and for transmitting said signals, a control system for controlling and in communication with the measurement sensor apparatus for receiving signals from the measurement sensor apparatus indicative of said distance and for processing said signals to calculate a pool depth corresponding to said distance, and angle adjustment apparatus connected to the basket and controlled by the control system for adjusting angle of the basket, thereby adjusting extent of the beach. Such a vibratory separator may have one or some, in any possible combination, of the following: wherein the vibratory separator is a shale shaker and the material is drilling fluid with drilled cuttings therein; wherein the screen apparatus includes at least an exit screen with an exit end from which material separated by the screen apparatus flows off the screen apparatus for discharge from the vibratory separator, wherein the basket is at an angle such that the beach is formed adjacent an edge of the pool adjacent said exit end, and wherein the control system controls extent of the beach; wherein the control system controls extent of the beach to maintain the beach on the exit screen; wherein the screen apparatus is a plurality of screens placed adjacent each other in the basket, each screen with an associated screen support connected to the basket; wherein the angle adjustment apparatus includes a basket support pivotably mounted to the base and moving apparatus for selectively moving the basket up and down; wherein the basket has a fluid entry end and a fluid exit end and wherein the basket is pivotably mounted adjacent the fluid exit end, and wherein the angle adjustment apparatus moves the basket's fluid entry end; wherein the moving apparatus includes hydraulic cylinder apparatus for moving the basket; wherein the hydraulic cylinder apparatus includes two hydraulically powered piston apparatuses, each on a side of the basket for moving the basket; wherein each hydraulically powered piston apparatus is pivotably interconnected with corresponding linkage apparatus, the linkage apparatus pivotably connected to the basket support adjacent the fluid entry end of the basket; wherein the measurement sensor apparatus is ultrasonic apparatus; wherein the ultrasonic apparatus is at least one ultrasonic apparatus; wherein the measurement sensor apparatus is a plurality of distance sensor apparatuses; wherein the plurality of sensor apparatuses includes a first ultrasonic sensor apparatus spaced-apart from a second ultrasonic sensor apparatus, the first ultrasonic sensor apparatus above one side of the screen apparatus and the second ultrasonic sensor apparatus above an opposite side of the screen apparatus; wherein the measurement sensor apparatus is from the group consisting of electrical, optical, electromagnetic, ultrasonic, acoustic, and pulse-echo apparatus; wherein a rear boundary of the beach is along a rear beach line and the basket is pivotably connected to the base beneath the rear beach line; and/or wherein the angle adjustment apparatus is powered by power apparatus FIGS. 11A-11D show a shale shaker 500 according to the present invention which is like a King Cobra Shale Shaker commercially available from Varco International, Inc., but which has improvements according to the present invention. The shale shaker 500 has a skid or base 502 on which is a basket 506 which is vibrated by vibration apparatus 504. From a tank 508 fluid, e.g. drilling fluid with drilled cuttings and debris therein, flows onto a first screen 510 which is supported by a screen support 510a connected to the basket 506. Part of the fluid then flows onto a second screen 511 supported by a screen support 511a connected to the basket 506 and then part of the fluid flows onto a last screen 512 supported by a screen support 512a connected to the basket 506. Part of the fluid flows off an exit end 512b of the screen 512 onto an optional lower screen 513 which is supported by a screen support 513a connected to the basket 506. Fluid flows into a lower sump or receptacle 503.

The fluid forms a pool 515 above the screens 510-512. A beach 516 is at the exit end 512b of the screen 512. It is desirable to control and/or optimize the extent of this beach 516 and, in certain aspects, it is preferred that the beach, as viewed in FIG. 11B, be sufficiently large that no fluid flows untreated off the last screen 512.

An ultrasonic transducer sensor measurement apparatus 520 is connected to the shale shaker, e.g. to a skid, base, tank or as shown to the basket 506 and is, optionally, positioned above the pool 515, e.g. over an entry end 510b of the screen 510. The apparatus 520 is in communication with a control apparatus 530 (e.g., but not limited to, a computer). The sensor apparatus generates a signal indicative of sensor-to-pool distance which indicates depth of the pool 515 beneath the sensor apparatus(es).

The control apparatus 530 selectively controls a bladder apparatus 536 which selectively raises and lowers a rocker arm assembly 540 which, in turn, raises and lowers the basket 506 to which the rocker arm assembly 540 is connected optionally the rocker arm assembly's angle with respect to the horizontal is selectively adjustable by a mechanical mechanism, e.g. any suitable known mechanical mechanism for moving the rocker arm assembly up and down, e.g., but not limited to, a screw mechanism or an hydraulic or pneumatic psiton device.

A top part 536a of the bladder apparatus 536 contacts a lower surface 541a of a plate 541 of the rocker arm assembly 540. The bladder apparatus 536 inflates to raise the rocker arm assembly 540 and deflates to lower it. A gas, e.g. air, or a liquid, e.g. a water-glycol mixture, can be used to inflate the bladder apparatus 536. The control apparatus 530 controls the bladder apparatus 536. It is within the scope of the present invention to use, instead of the air bladder apparatus 536, to move the rocker arm assembly up and down: a linear actuator device or other electronically-operated device; a hydraulically-powered device, e.g. an hydraulic cylinder system; or an air-over-hydraulic apparatus, e.g. a system with a liquid-filled tank with air pressure. In one particular embodiment the air bladder apparatus 536 is a commercially available Model 20-2 from Firestone Company. Although only one air bladder apparatus 536 is shown, it is within the scope of the present invention to use two such apparatuses, one on each side of the basket 506.

The rocker arm assembly 540 has pivot shafts 542 which pivot in corresponding recesses 543 of mounts 544 on the skid 502. The rocker arm assembly 540 has two side members 545 interconnected with an end member 546. Spring mounts 54, welded to the basket 506, support springs 548 which are connected to the brackets 549.

An optional ultrasonic sensor apparatus 522, in communication with the control apparatus 530, senses whether or not there is fluid flow from the tank 508 to the pool 515. If a "no-flow" signal is generated by the apparatus 522 and sent to the control apparatus 530, then the basket is tilted to its maximum uphill angle in anticipation of a next rush of mud. An optional ultrasonic sensor apparatus 524 senses the location (height) of the plate 541, and produces a signal indicative of this location, which is a signal whose value corresponds to the angle of the rocker arm assembly 540 and, therefore, to the angle of the basket 506 (and which correlates with signal values from the apparatus 522). In one aspect, the control apparatus 530 computes the basket angle based on the signal from the ultrasonic sensor apparatus 524 and correlates this computed angle with the value for the pool depth based on the signal from the ultrasonic sensor apparatus 520. If these two values correlate, this indicates the system is working properly. If there is a discrepancy between the values (from the ultrasonic sensors) (e.g. a discrepancy caused by high flow, downhill basket orientation or low fluid level) this indicates a measurement problem and the control apparatus 530 then adjusts the basket to a fully uphill angle until there is no such discrepancy.

Figure 11A:
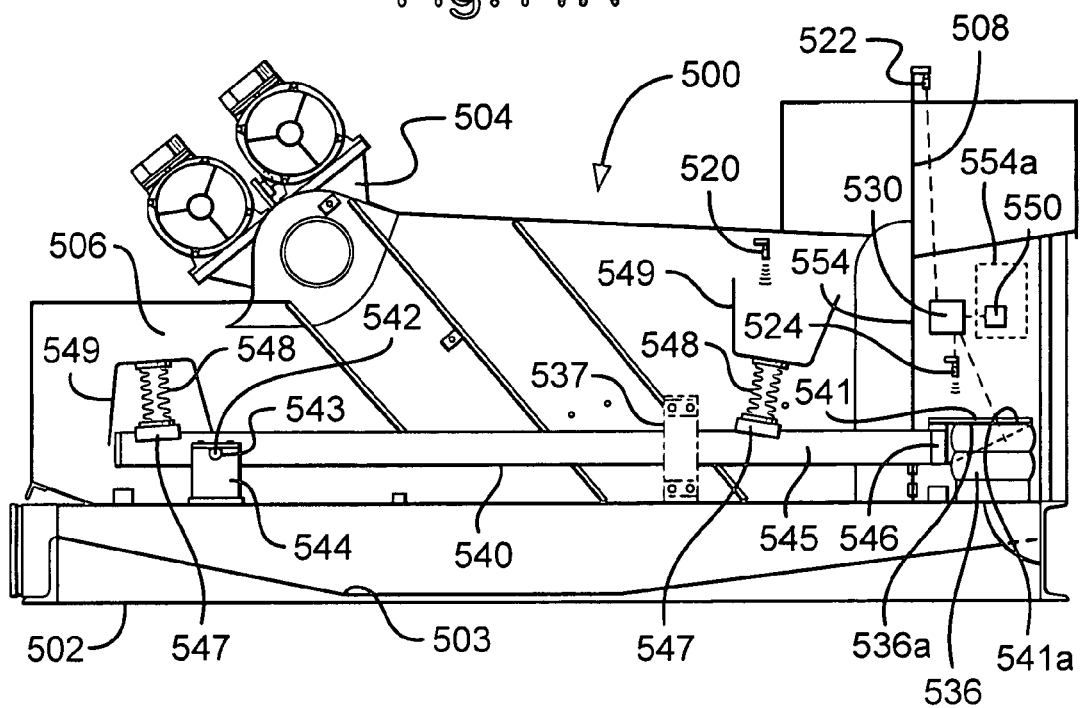
FIG. 11A is a side end view of a shale shaker according to the present invention.
Figure 11B:
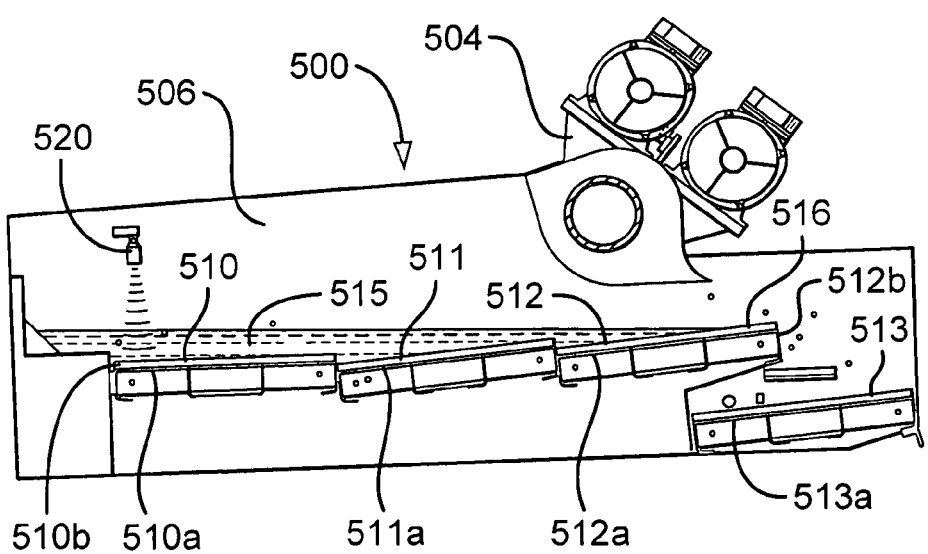
FIG. 11B is a partial cross-section view of the shale shaker of FIG. 11A.
Figure 11C:
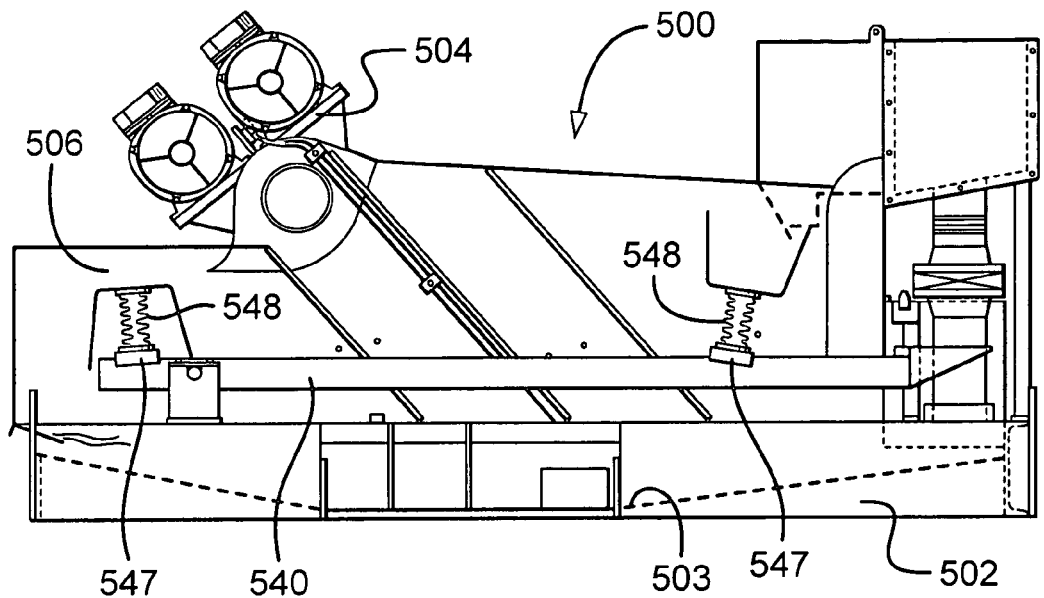
FIG. 11C is a partial cross-section view of the shale shaker of FIG. 11A.
Figure 11D:
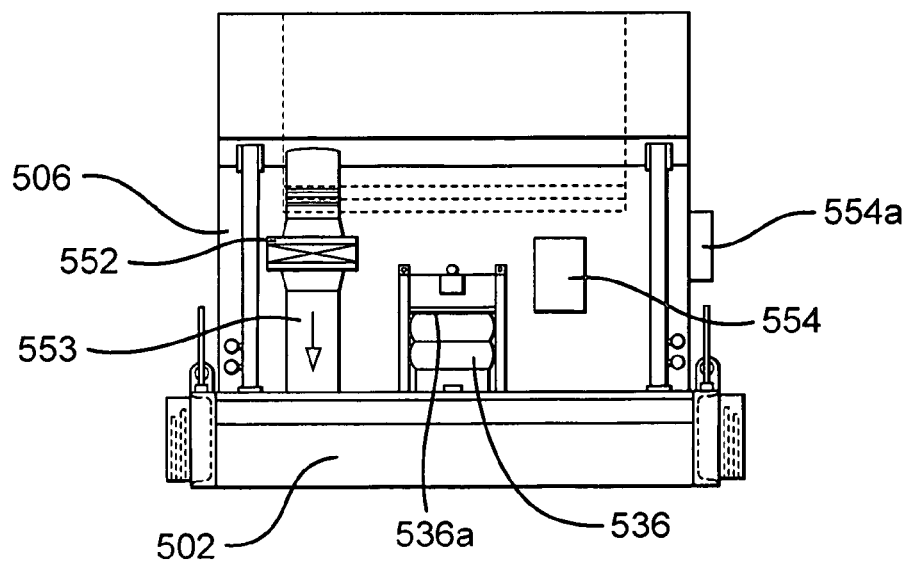
FIG. 11D is an end view of the shale shaker of FIG. 11A.
Figure 12A:
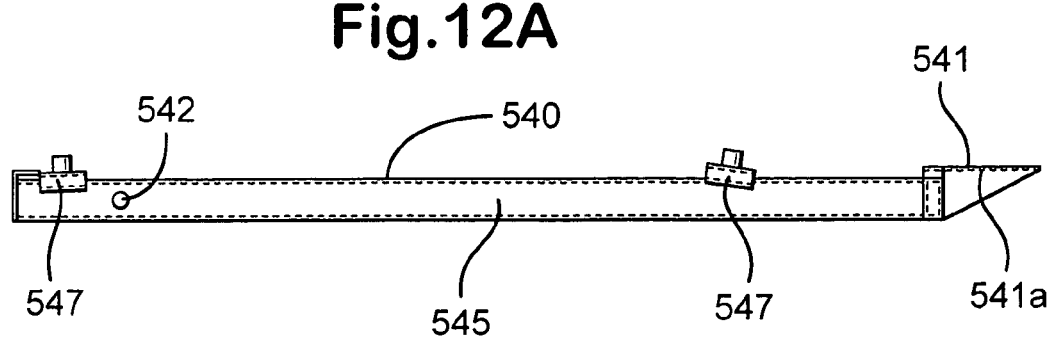
FIG. 12A is a side view of a rocker arm assembly of the shale shaker of FIG. 11A.
Figure 12B:
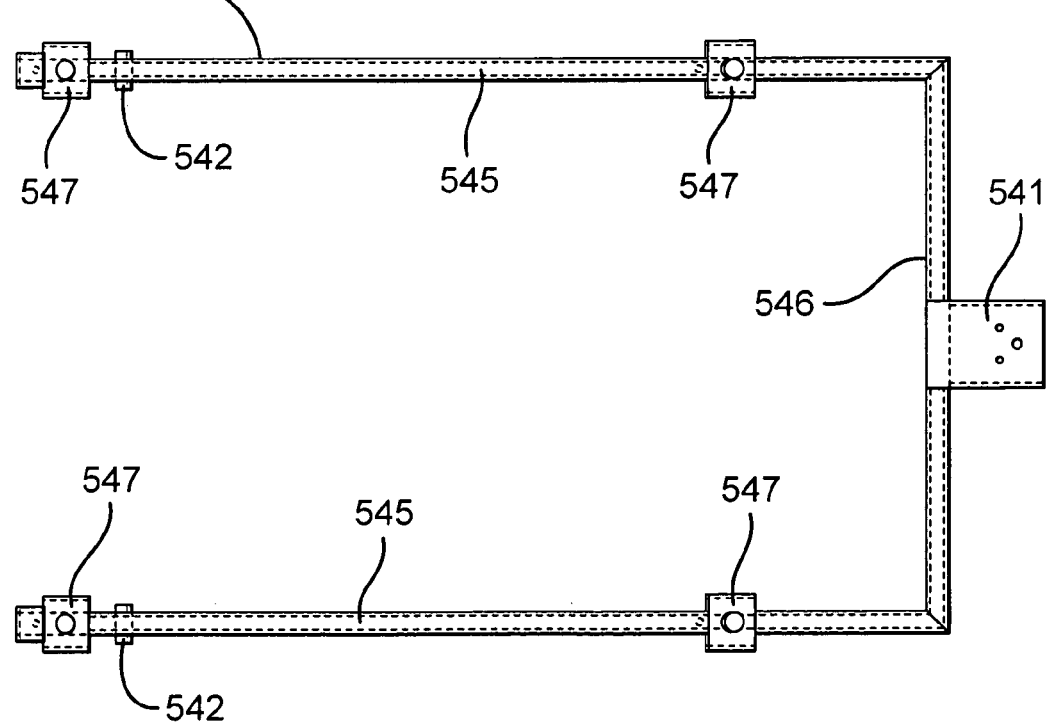
FIG. 12B is a top view of the rocker arm assembly of FIG. 12A.

Optionally, the shale shaker 500 includes a variable frequency drive 550 (optionally in an enclosure rated for a Class 1, Dviision 1, or Zone 1 hazardous area) whose functions include varying the rpm's of the vibration apparatus 504 and thus varying the G-forces (acceleration) imparted to the basket 506 by the vibration apparatus 504; and changing the direction of rotation of the vibration apparatus 504 thereby changing the motion of the basket 506, e.g. from linear motion to elliptical motion. In one particular aspect the vibration apparatus 504 includes a Model VMX 18-8300-80 vibrator or a Model VMX 18-8300-110 from Martin Engineering which have dual motion motors with the capability of changing an imbalance of weights based on rotation direction to change motion, e.g. from linear to elliptical (or vice versa). The control apparatus 530, and/or the ultrasonic sensor apparatus 524 and/or the apparatus 550 may be located at any convenient location on the shale shaker 500. As shown in FIG. 11A they are protected within an enclosure 554 formed of parts of the tank made of resilient material, e.g. metal or composite. Alternatively the drive 550 is located in a separate enclosure 554a (shown by dotted lines).

Apparatus 552 provides a channel 553 for fluid in the tank 508 to bypass the screens 510-512 and flow directly into the receptacle 503.

Figure 13:
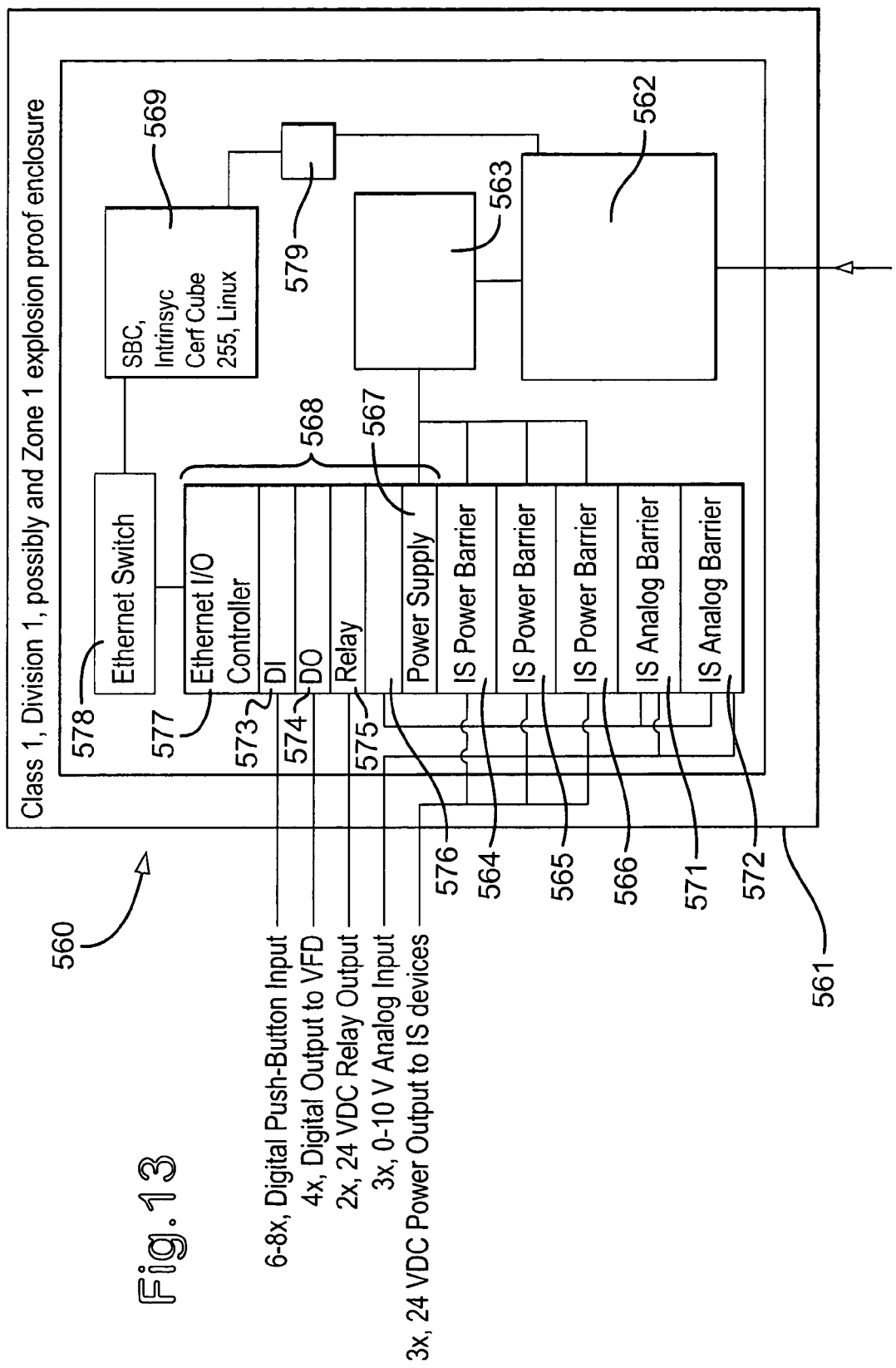
FIG. 13 is a schematic view of a control system according to the present invention for a vibratory separator according to the present invention.

FIG. 13 shows a computer 560 which can be used, in one aspect, for the control apparatus 530. Optionally, the computer 560 is positioned within an enclosure 561 which is suitable for installation in a Class 1, Division 1 or Zone 1, hazardous area. AC Power is input to an AC to DC transformer 562 which provides power to a power supply 579 and to a power supply 563 (which in turn supplies power to barrier devices 564, 565, and 566. The power supply 563 provides power, e.g. 24 VDC, to a power supply 567 of an Input/Output device 568. The power supply 579 provides power (e.g. 5 VDC) to a single board computer 569 which runs a control program and reads the I/O device, and sends control signals to electrically actuated valves (e.g. 670, 671, FIG. 14) to control the shaker's basket angle. The power barrier devices 564-566 provide power, e.g. 24 VDC, to various intrinsically safe ("IS") devices, e.g. the ultrasonic sensor apparatuses. The computer 569 can be programmed to provide a basket angle reset to reset a value of the ultrasonic sensor apparatuses' measurement of a "home" position of the basket (e.g. a maximum uphill angle).

Analog barrier devices 571 and 572 limit the power of signals on analog devices, i.e. the ultrasonic sensors. Supply 567 provides power to the devices 573-576. A digital input card 573 receives digital input signals from other devices, e.g. the VFD and user push buttons. A digital output card 574 outputs digital signals to other devices, e.g. to the VFD. A relay card 575 provides switch openings and closures for sending control signals from the computer to other devices, e.g. control valves. An analog input card 576 receives analog signals from other devices; e.g. from the ultrasonic sensor apparatuses.

Optionally the Input/Output device 568 may have a switch or connection 578 for communication with a system (e.g. a computer or computer system) apart from and/or remote from a shale shaker or vibratory separator, e.g., but not limited to an Ethernet Input/Output Controller which, in turn, provides to connection to other systems, e.g. the Internet.

Figure 14:
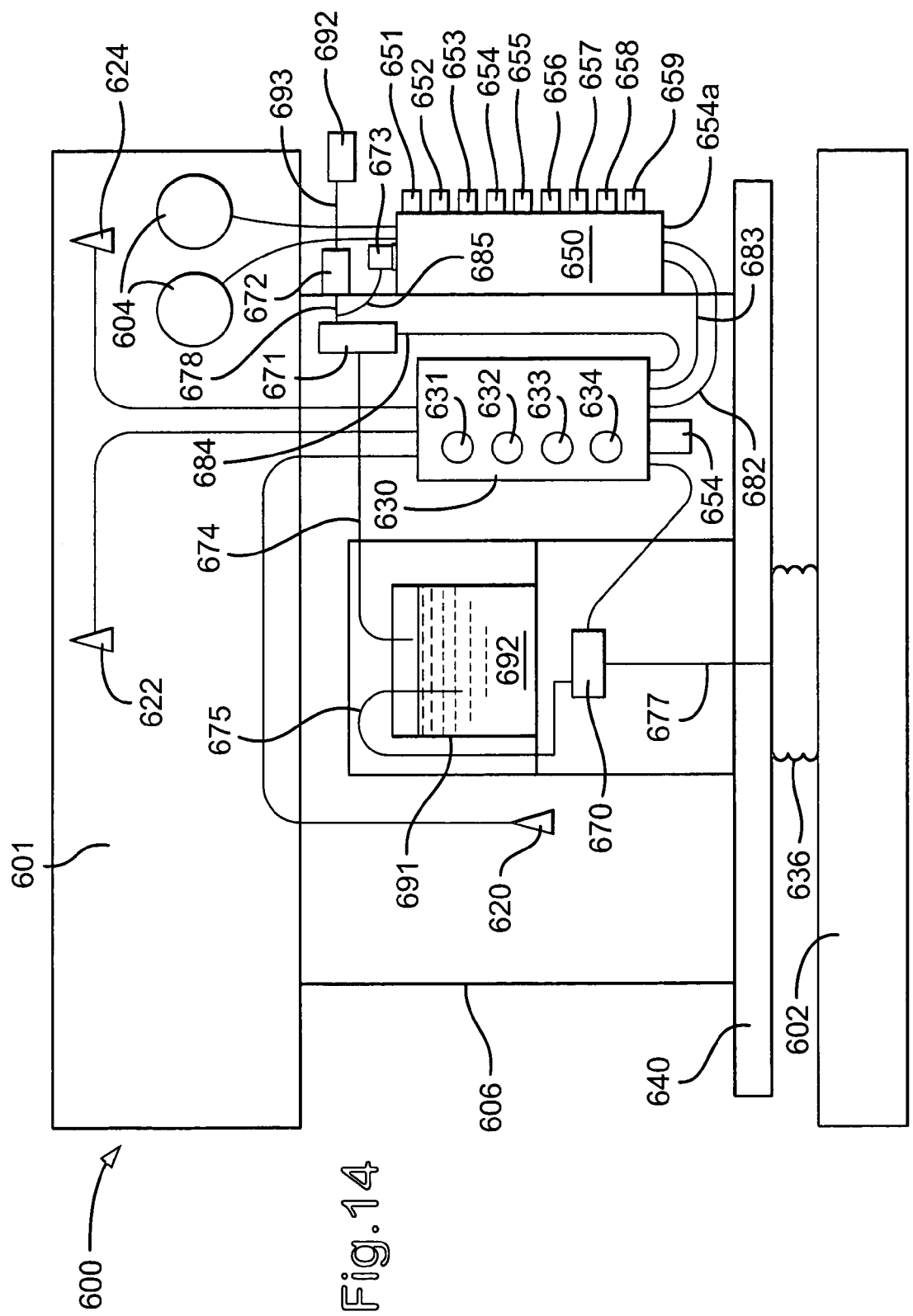
FIG. 14 is a schematic view of a system according to the present invention.

FIG. 14 illustrates schematically a system 600 according to the present invention which is like the systems shown in FIGS. 11A-13. A shaker 601 (e.g. like the shaker 500 or any shaker disclosed or referred to herein) has a rocker arm assembly 640 (e.g. like the assembly 540) which can be raised and lowered by a bladder apparatus 636 (e.g. like the apparatus 536) which is mounted on a skid 602. Vibratory motors 604 (e.g. like the motors 504) vibrate a basket 606 (e.g. like the basket 506).

Ultrasonic sensor apparatuses 620, 622, 624 (e.g. like the apparatuses 520, 522 524) provide signals to a control system 630 (e.g. like the control apparatus 520) for sensing system parameters and for controlling the rocker arm assembly to adjust basket angle and to control the motors 604. The control apparatus 630 is housed within an enclosure 654 (e.g. like the enclosure 554).

An optional variable frequency drive system ("VFD") 650 (e.g. like the system 550) in an enclosure 654a (e.g. like the enclosure 554a) is in communication with the system 630 and provides control of the motors 604 (i.e. control of G forces on the screens and/or control of type of motion) and control of the basket angle. In one particular aspect the system 630 has manually-operable push buttons 631-634. The buttons 631-633 provide for calibration of the ultrasonic sensor apparatuses 620, 622, 624, respectively. The button 634 is a system re-set button.

The VFD 650 has manually-operable push buttons 651-656 and 658-659 which function as follows:

651 On
652 Off
653 Switch between linear/elliptical motor motion
654 Power to system 630
655 Switch between automatic and manual mode
656 System 650 re-set
658 Move basket up (increase basket angle)
659 Move basket down (decrease basket angle)

Valves 670 and 671 are electronically-operated valves. Power is provided to the valve 670 via a power line 681 from the system 630 and to the valve 671 via a power line 684. The basket is raised or lowered by selectively opening or closing the valve 670 which permits fluid 692 (e.g. a water-glycol mixture) to flow to or from the bladder apparatus 636 from a controlled pressure reservoir 691 in a line 675 and to or from the valve 670 in a line 677.

The valve 671 controls air flow between an air inlet 672 and the reservoir 691. Air under pressure from a source 692 flows in a line 693 to the air inlet 672 and then via the lines 678 and 674 to and from the reservoir 691 to move the fluid 692 for raising and lowering of the basket to adjust basket angle.

A cooler 673, e.g. a vortex cooler apparatus in fludi communicationwith teh air inlet 672 via lines 678 and 685, cools the interior of the enclosure 654*a*.

The present invention, therefore, provides, in at least certain embodiments, a vibratory separator or shale shaker with a base; a basket movably mounted on the base and for supporting screen apparatus for treating material introduced into the vibratory separator, the basket on the base and pivotable with respect thereto; vibratory apparatus connected to the basket for vibrating the basket; screen apparatus supported by the basket, the material flowing onto the screen apparatus for treatment; angle adjustment apparatus connected to the basket for adjusting angle of the basket; sensor apparatus, e.g., ultrasonic, for sensing a parameter indicative of basket angle and for providing a signal corresponding to said basket angle; control apparatus for receiving signals from the sensor apparatus and for controlling basket angle based on said signals; the angle adjustment apparatus including a rocker arm assembly with a first end and a second end, the first end pivotably mounted to the base adjacent and beneath a material input area of the vibratory separator and the second end adjacent and beneath a material exit end of the vibratory separator; and the angle adjustment apparatus including movement apparatus with a part thereof in contact with the second end of the rocker arm assembly for moving the second end up and down to change basket angle, the movement apparatus controlled by the control apparatus. Such an apparatus may have one or some, in any possible combination, of the following: wherein the vibratory separator is a shale shaker and the material is drilling fluid with drilled cuttings therein; wherein the vibratory apparatus comprises two motors for vibrating the basket, the two motors providing dual motion capability; wherein the screen apparatus includes at least an exit screen with an exit end from which material separated by the screen apparatus flows off the screen apparatus for discharge from the vibratory separator, wherein the basket is at an angle such that a beach is formed adjacent an edge of a pool of material adjacent said exit end, and wherein the control system controls extent of a beach; wherein the sensor apparatus is ultrasonic sensor apparatus; wherein the ultrasonic sensor apparatus is at least one ultrasonic sensor apparatus; wherein the sensor apparatus is a plurality of sensor apparatuses; wherein said plurality of sensor apparatuses includes a first ultrasonic sensor apparatus spaced-apart from a second ultrasonic sensor apparatus, the first ultrasonic sensor apparatus for sensing material level in the basket and the second ultrasonic sensor apparatus for sensing rate of material flow into the basket; wherein the measurement sensor apparatus is from the group consisting of electrical, optical, electromagnetic, ultrasonic, acoustic, and pulse-echo apparatus; flow sensor apparatus connected to the vibratory separator for sensing the flow of material onto the screen apparatus, the flow sensor apparatus controlled by and in communication with the control apparatus, and the control apparatus for adjusting basket angle in response to signals from the flow sensor apparatus; wherein said plurality includes a third ultrasonic sensor apparatus for sensing basket angle; wherein the angle adjustment apparatus is powered by power apparatus from the group consisting of pneumatic power apparatuses, hydraulic power apparatuses and electric power apparatuses; and/or wherein the movement apparatus of the angle adjustment apparatus includes inflatable bladder apparatus which is selectively inflatable to raise and lower the rocker arm assembly.

The present invention, therefore, provides, in at least certain embodiments, a vibratory separator or shale shaker with a base; a basket movably mounted on the base and for supporting screen apparatus for treating material introduced into the vibratory separator, the basket on the base and pivotable with respect thereto; vibratory apparatus connected to the basket for vibrating the basket; screen apparatus supported by the basket, the material flowing onto the screen apparatus for treatment; angle adjustment apparatus connected to the basket for adjusting angle of the basket; sensor apparatus connected to the basket for sensing a parameter indicative of basket angle and for providing a signal corresponding to said basket angle; control apparatus for receiving signals from the sensor apparatus and for controlling basket angle based on said signals; the angle adjustment apparatus including a rocker arm assembly with a first end and a second end, the first end pivotably mounted to the base adjacent and beneath a material input area of the vibratory separator and the second adjacent and beneath a material exit end of the vibratory separator; the angle adjustment apparatus including movement apparatus with a part thereof in contact with the second end of the rocker arm assembly for moving the second end up and down to change basket angle, the movement apparatus controlled by the control apparatus; wherein the vibratory separator in one aspect is a shale shaker and the material is drilling fluid with drilled cuttings therein; wherein the vibratory apparatus has two motors for vibrating the basket, the two motors providing a dual motion capability; wherein the screen apparatus includes at least an exit screen with an exit end from which material separated by the screen apparatus flows off the screen apparatus for discharge from the vibratory separator; wherein the basket is at an angle such that a beach is formed adjacent an edge of a pool of material adjacent said exit end; wherein the control system controls extent of a beach; wherein the sensor apparatus is ultrasonic sensor apparatus; wherein the sensor apparatus is a plurality of sensor apparatuses which includes a first ultrasonic sensor apparatus, second ultrasonic sensor apparatus, and third ultrasonic sensor apparatus for sensing basket angle, the first ultrasonic sensor apparatus for sensing material level in the basket and the second ultrasonic sensor apparatus for sensing material flow rate into the basket; the control apparatus for adjusting basket angle in response to signals from the sensor apparatuses; and correlation apparatus for correlating signals from the three ultrasonic sensor apparatuses to check system adjustment.

The present invention, therefore, provides, in at least certain embodiments, a vibratory separator with a base; a basket movably mounted on the base and for supporting screen apparatus for treating material introduced at a first end of the basket into the vibratory separator, the basket on the base and the first end pivotable with respect thereto, the basket having a second end spaced apart from the first end, material exiting the basket at the second end; vibratory apparatus connected to the basket for vibrating the basket; screen apparatus supported by the basket, the material flowing onto the screen apparatus for treatment; angle adjustment apparatus connected to the basket for adjusting angle of the basket by pivoting the basket's first end; sensor apparatus for sensing a parameter indicative of basket angle and for providing a signal corresponding to said basket angle; control apparatus for receiving signals from the sensor apparatus and for controlling basket angle based on said signals; and the angle adjustment apparatus including movement apparatus for moving the second end up and down to change basket angle, the movement apparatus controlled by the control apparatus.

Such an apparatus may have one or some, in any possible combination, of the following: wherein the vibratory separator is a shale shaker and the material to be treated is drilling fluid with drilled cuttings therein; wherein said plurality of sensor apparatuses includes a first ultrasonic sensor apparatus spaced-apart from a second ultrasonic sensor apparatus, the first ultrasonic sensor apparatus for sensing material level in the basket and the second ultrasonic sensor apparatus for sensing rate of material flow into the basket and wherein said plurality of sensor apparatuses includes a third ultrasonic sensor apparatus for sensing basket angle, and correlation apparatus for correlating signals from all three ultrasonic sensor apparatuses to check system adjustment; a variable frequency drive connected to the basket for controlling the vibratory apparatus; computer apparatus for controlling the vibratory separator; wherein the computer apparatus performs the functions of a variable frequency drive; and/or boost push button apparatus for manually changing forces applied by the vibratory apparatus.

The present invention, therefore, provides, in at least certain embodiments, a method for treating material introduced to a vibratory separator, the method including introducing material to a vibratory separator, the vibratory separator like any according to the present invention, treating the material in the vibratory separator, and adjusting the angle of the basket with angle adjustment apparatus. Such an apparatus may have one or some, in any possible combination, of the following: wherein the vibratory separator is a shale shaker and the material is drilling fluid with drilled cuttings therein; and wherein the vibratory apparatus comprises two motors for vibrating the basket, the two motors providing dual motion capability, the method further including changing motion using the two motors.

The present invention, therefore, provides, in at least certain embodiments, beach adjustment apparatus for adjusting extent of a beach on a screen of a vibratory separator, the screen mounted to a vibratable basket of the vibratory separator, the beach adjustment apparatus including an end-pivotable basket support for supporting the basket, the end-pivotable basket support pivotable at a pivot end thereof, the end pivotable basket support having a second end spaced-apart from the pivot end, the second end positionable near an exit end of a vibratory separator; apparatus for pivoting the end-pivotable basket support at its pivot end; and the apparatus for pivoting the end-pivotable basket support including movement apparatus having a part thereof for contacting the second end of the end-pivotable basket support for facilitating pivoting movement of the end-pivotable basket support to raise and lower the second end to adjust the extent of the beach.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112.

What is claimed is:

1. A vibratory separator comprising
   a base,
   a basket movably mounted on the base and for supporting screen apparatus for treating material introduced into the vibratory separator, the basket on the base and pivotable with respect thereto,
   vibratory apparatus connected to the basket for vibrating the basket,
   screen apparatus supported by the basket, the material flowing onto the screen apparatus for treatment,
   angle adjustment apparatus connected to the basket for adjusting angle of the basket,
   sensor apparatus connected to the vibratory separator for sensing a parameter indicative of basket angle and for providing a signal corresponding to said basket angle,
   control apparatus for receiving signals from the sensor apparatus and for controlling basket angle based on said signals,
   the angle adjustment apparatus including a rocker arm assembly with a first end and a second end, the first end pivotably mounted to the base adjacent and beneath a material input area of the vibratory separator and the second end adjacent and beneath a material exit end of the vibratory separator,
   the angle adjustment apparatus including movement apparatus with a part thereof in contact with the second end of the rocker arm assembly for moving the second end up and down to change basket angle, the movement apparatus controlled by the control apparatus,
   wherein the movement apparatus of the angle adjustment apparatus includes inflatable bladder apparatus which is selectively inflatable to raise and lower the rocker arm assembly,
   a plate projecting from the second end of the rocker arm assembly, the plate having a lower surface, and
   the inflatable bladder apparatus contacting the lower surface of the plate to move the rocker arm assembly to raise and lower the basket.

2. The vibratory separator of claim 1 wherein the vibratory separator is a shale shaker and the material is drilling fluid with drilled cuttings therein.

3. The vibratory separator of claim 2 wherein the vibratory apparatus comprises two motors for vibrating the basket, the two motors providing dual motion capability.

4. The vibratory separator of claim 1
wherein the screen apparatus includes at least an exit screen with an exit end from which material separated by the screen apparatus flows off the screen apparatus for discharge from the vibratory separator,
wherein the basket is at an angle such that a beach is formed adjacent an edge of a pool of material adjacent said exit end, and
wherein the control system controls extent of a beach.

5. The vibratory separator of claim 1 wherein the sensor apparatus is an ultrasonic sensor apparatus.

6. The vibratory separator of claim 5 wherein the ultrasonic sensor apparatus is at least one ultrasonic sensor apparatus.

7. The vibratory separator of claim 1 wherein the sensor apparatus comprises a plurality of sensor apparatuses.

8. The vibratory separator of claim 1 wherein the measurement sensor apparatus is from the group consisting of electrical, optical, electromagnetic, ultrasonic, acoustic, and pulse-echo apparatus.

9. The vibratory separator of claim 1 further comprising
flow sensor apparatus connected to the vibratory separator for sensing the flow of material onto the screen apparatus,
the flow sensor apparatus controlled by and in communication with the control apparatus, and
the control apparatus for adjusting basket angle in response to signals from the flow sensor apparatus.

10. The vibratory separator of claim 1 wherein the sensor apparatus includes an angle sensor for sensing basket angle.

11. The vibratory separator of claim 1 wherein the angle adjustment apparatus is powered by power apparatus from the group consisting of pneumatic power apparatuses, hydraulic power apparatuses and electric power apparatuses.

12. The vibratory separator of claim 1 further comprising computer apparatus for controlling the vibratory separator.

13. The vibratory separator of claim 1 further comprising boost push button apparatus for manually changing forces applied by the vibratory apparatus.

14. A method for treating material introduced to a vibratory separator, the method comprising
introducing material to a vibratory separator, the vibratory separator comprising a base, a basket movably mounted on the base and for supporting screen apparatus for treating material introduced into the vibratory separator, the basket on the base and pivotable with respect thereto, vibratory apparatus connected to the basket for vibrating the basket, screen apparatus supported by the basket, the material flowing onto the screen apparatus for treatment, angle adjustment apparatus connected to the basket for adjusting angle of the basket, sensor apparatus connected to the vibratory separator for sensing a parameter indicative of basket angle and for providing a signal corresponding to said basket angle, control apparatus for receiving signals from the sensor apparatus and for controlling basket angle based on said signals, the angle adjustment apparatus including a rocker arm assembly with a first end and a second end, the first end pivotably mounted to the base adjacent and beneath a material input area of the vibratory separator and the second end adjacent and beneath a material exit end of the vibratory separator, the angle adjustment apparatus including movement apparatus with a part thereof in contact with the second end of the rocker arm assembly for moving the second end up and down to change basket angle, the movement apparatus controlled by the control apparatus, wherein the movement apparatus of the angle adjustment apparatus includes inflatable bladder apparatus which is selectively inflatable to raise and lower the rocker arm assembly, a plate projecting from the second end of the rocker arm assembly, the plate having a lower surface, and the inflatable bladder apparatus contacting the lower surface of the plate to move the rocker arm assembly to raise and lower the basket,
treating the material in the vibratory separator, and
adjusting the angle of the basket with the angle adjustment apparatus.

15. The method of claim 14 wherein the vibratory separator is a shale shaker and the material is drilling fluid with drilled cuttings therein.

16. Beach adjustment apparatus for adjusting extent of a beach on a screen of a vibratory separator, the screen mounted to a vibratable basket of the vibratory separator, the beach adjustment apparatus comprising
an end-pivotable basket support for supporting the basket, the end-pivotable basket support pivotable at a pivot end thereof, the end pivotable basket support having a second end spaced-apart from the pivot end, the second end positionable near an exit end of a vibratory separator,
means for pivoting the end-pivotable basket support at its pivot end,
the means for pivoting the end-pivotable basket support including movement apparatus having a part thereof for contacting the second end of the end-pivotable basket support for facilitating pivoting movement of the end-pivotable basket support to raise and lower the second end to adjust the extent of the beach,
wherein the movement apparatus of the angle adjustment apparatus includes inflatable bladder apparatus which is selectively inflatable to raise and lower the end-pivotable basket support,
a plate projecting from the second end of the end-pivotable basket support, the plate having a lower surface, and
the inflatable bladder apparatus contacting the lower surface of the plate to move the end-pivotable basket support to raise and lower the basket.

17. A shale shaker comprising
a base,
a basket movably mounted on the base for supporting screen apparatus for treating drilling fluid material introduced into the shale shaker, the basket on the base and pivotable with respect thereto, the drilling fluid material including drilling fluid and solids,
vibratory apparatus connected to the basket for vibrating the basket,
screen apparatus supported by the basket, the drilling fluid material flowing onto the screen apparatus for treatment, so that drilling fluid flows down through the screen apparatus,
angle adjustment apparatus connected to the basket for adjusting angle of the basket,
sensor apparatus connected to the vibratory separator for sensing a parameter indicative of basket angle and for providing a signal corresponding to said basket angle, control apparatus for receiving signals from the sensor apparatus and for controlling basket angle based on said signals, the angle adjustment apparatus including a rocker arm assembly with a first end and a second end, the first end pivotably mounted to the base adjacent and beneath a material input area of the vibratory separator and the second end adjacent and beneath a material exit end of the vibratory separator, the angle adjustment apparatus including movement apparatus with a part thereof in contact with the second end of the rocker arm assembly for moving the second end up and down to change basket angle, the movement apparatus controlled by the control apparatus, wherein the movement apparatus of the angle adjustment apparatus includes inflatable bladder apparatus which is selectively inflatable to raise and lower the rocker arm assembly, a plate projecting from the second end of the rocker arm assembly, the plate having a lower surface, and the inflatable bladder appartus contacting the lower surface of the plate to move the rocker arm assembly to raise and lower the basket.

* * * * *